(12) United States Patent
Hande et al.

(10) Patent No.: US 11,480,952 B2
(45) Date of Patent: Oct. 25, 2022

(54) SYSTEM, METHOD AND CONTROL UNIT FOR DIAGNOSIS AND LIFE PREDICTION OF ONE OR MORE ELECTRO-MECHANICAL SYSTEMS

(71) Applicants: Vidyabhushana Hande, Bangalore (IN); P. V. Sudev Nair, Bangalore (IN)

(72) Inventors: Vidyabhushana Hande, Bangalore (IN); P. V. Sudev Nair, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 337 days.

(21) Appl. No.: 16/650,745

(22) PCT Filed: Sep. 27, 2018

(86) PCT No.: PCT/EP2018/076259
§ 371 (c)(1),
(2) Date: Mar. 25, 2020

(87) PCT Pub. No.: WO2019/063692
PCT Pub. Date: Apr. 4, 2019

(65) Prior Publication Data
US 2020/0310397 A1  Oct. 1, 2020

(30) Foreign Application Priority Data
Sep. 29, 2017 (EP) .................................. 17194193

(51) Int. Cl.
*G05B 19/418* (2006.01)
*F16C 41/00* (2006.01)
(Continued)

(52) U.S. Cl.
CPC ........ *G05B 19/41885* (2013.01); *F16C 41/00* (2013.01); *G05B 23/0254* (2013.01);
(Continued)

(58) Field of Classification Search
None
See application file for complete search history.

(56) References Cited

U.S. PATENT DOCUMENTS 7,826,990 B2 * 11/2010 Nasle ................. G05B 23/0254
702/85
7,917,333 B2 * 3/2011 Grichnik ................ G05B 17/02
702/182
(Continued)

FOREIGN PATENT DOCUMENTS

EP         2653944 A2    10/2013

OTHER PUBLICATIONS

Blechertas, Vytautas, et al. "CBM fundamental research at the university of south carolina: a systematic approach to US army rotorcraft CBM and the resulting tangible benefits." The American Helicopter Society Technical Specialists' Meeting on Condition Based Maintenance. Huntsville. 2009. (Year: 2009).*
(Continued)

*Primary Examiner* — Carlos R Ortiz Rodriguez
(74) *Attorney, Agent, or Firm* — Lempia Summerfield Katz LLC

(57) ABSTRACT

Systems, methods, and control units for diagnosis and life prediction of one or more electro-mechanical system are provided. One method includes receiving sensor data from a plurality of sensors associated with operation of the electro-mechanical system. The method includes determining at least one system response associated with at least one failure mode of the electro-mechanical system from the sensor data, wherein the sensor data is indicative of the at least one failure mode of the electro-mechanical system. The method further includes receiving at least one simulated response associated with the at least one failure mode of the electro-mechanical system, wherein the at least one failure mode is simulated on a system model of the electro-me-
(Continued)

chanical system. The method includes generating a hybrid model of the electro-mechanical system in real-time based on the at least one system response and the at least one simulated response, wherein the hybrid model combines the at least one system response and the at least one simulated. The method also includes generating a diagnosis of the electro-mechanical system based on the hybrid model, wherein the diagnosis includes identification of one or more failures in the electro-mechanical system and wherein the one or more failures indicates initiation of degradation of the one or more electro-mechanical system. The method includes predicting a life trend of the electro-mechanical system based on the diagnosis.

15 Claims, 13 Drawing Sheets

(51) Int. Cl.
G05B 23/02 (2006.01)
G06Q 10/04 (2012.01)
G06Q 10/06 (2012.01)
G06Q 10/00 (2012.01)

(52) U.S. Cl.
CPC ......... *G05B 23/0283* (2013.01); *G06Q 10/04* (2013.01); *G06Q 10/067* (2013.01); *G06Q 10/06375* (2013.01); *G06Q 10/20* (2013.01); *F16C 2233/00* (2013.01); *G05B 2219/50185* (2013.01)

(56) References Cited

U.S. PATENT DOCUMENTS

| | | | |
|---|---|---|---|
| 9,274,520 B2* | 3/2016 | Ali | F02C 7/00 |
| 2008/0140360 A1 | 6/2008 | Goebel | |
| 2008/0243328 A1* | 10/2008 | Yu | G05B 23/0232 701/31.2 |
| 2014/0379199 A1 | 12/2014 | Bastian et al. | |

OTHER PUBLICATIONS

Narayanaswamy, Balakrishnan, et al. "Data driven investigation of faults in HVAC systems with model, cluster and compare (MCC)." Proceedings of the 1st ACM Conference on Embedded Systems for Energy-Efficient Buildings. 2014. (Year: 2014).*
International Preliminary Report on Patentability for International Patent Application PCT/EP2018/076259 dated Dec. 11, 2019.
International Search Report and the Written Opinion for International Patent Application PCT/EP2018/076259 dated Apr. 4, 2019.

* cited by examiner

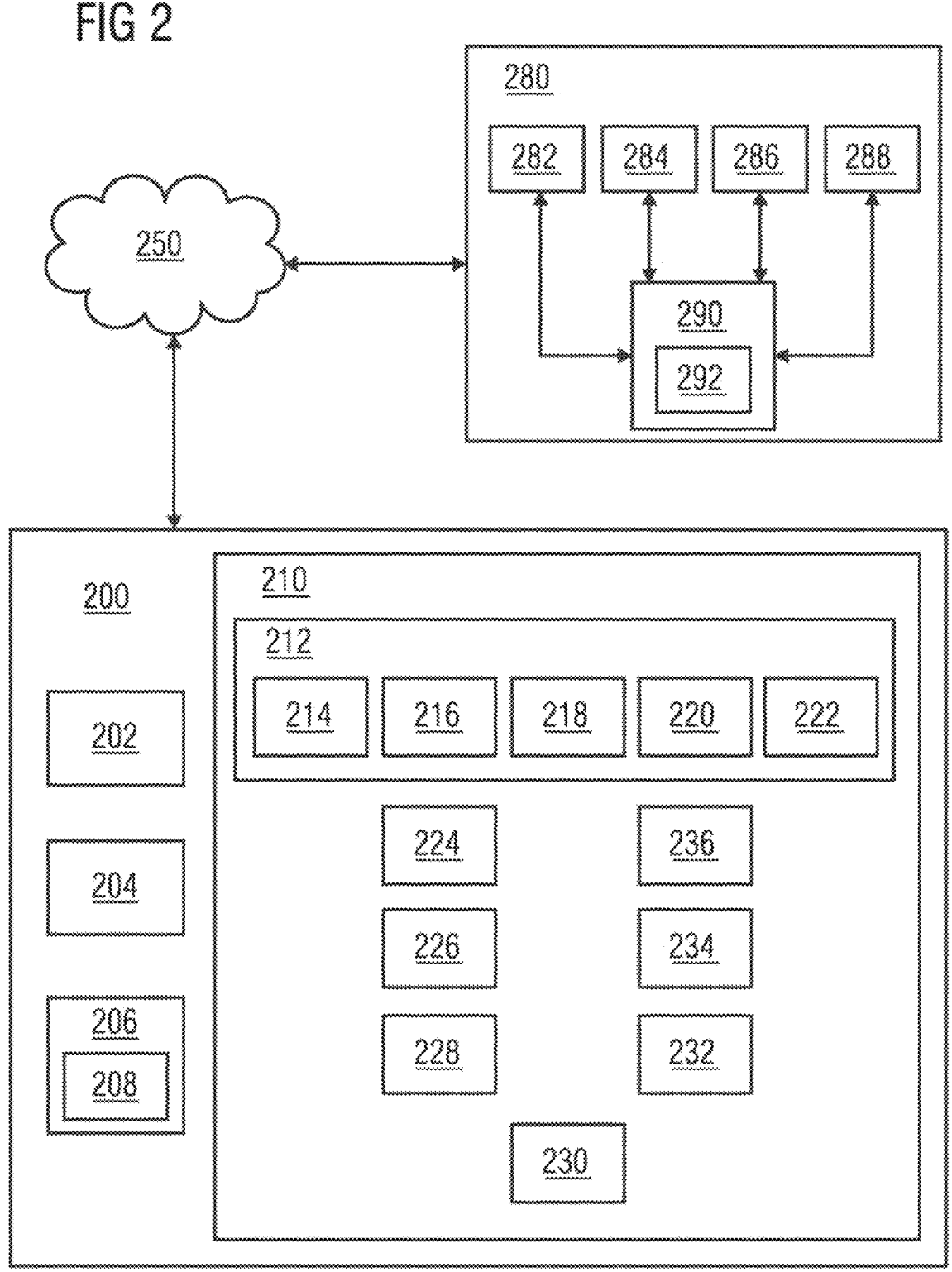

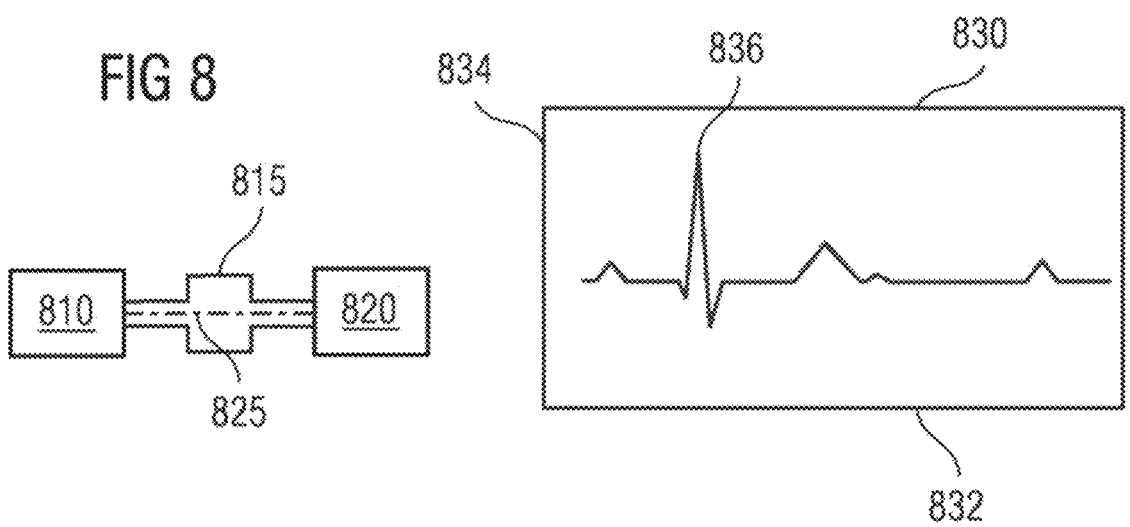

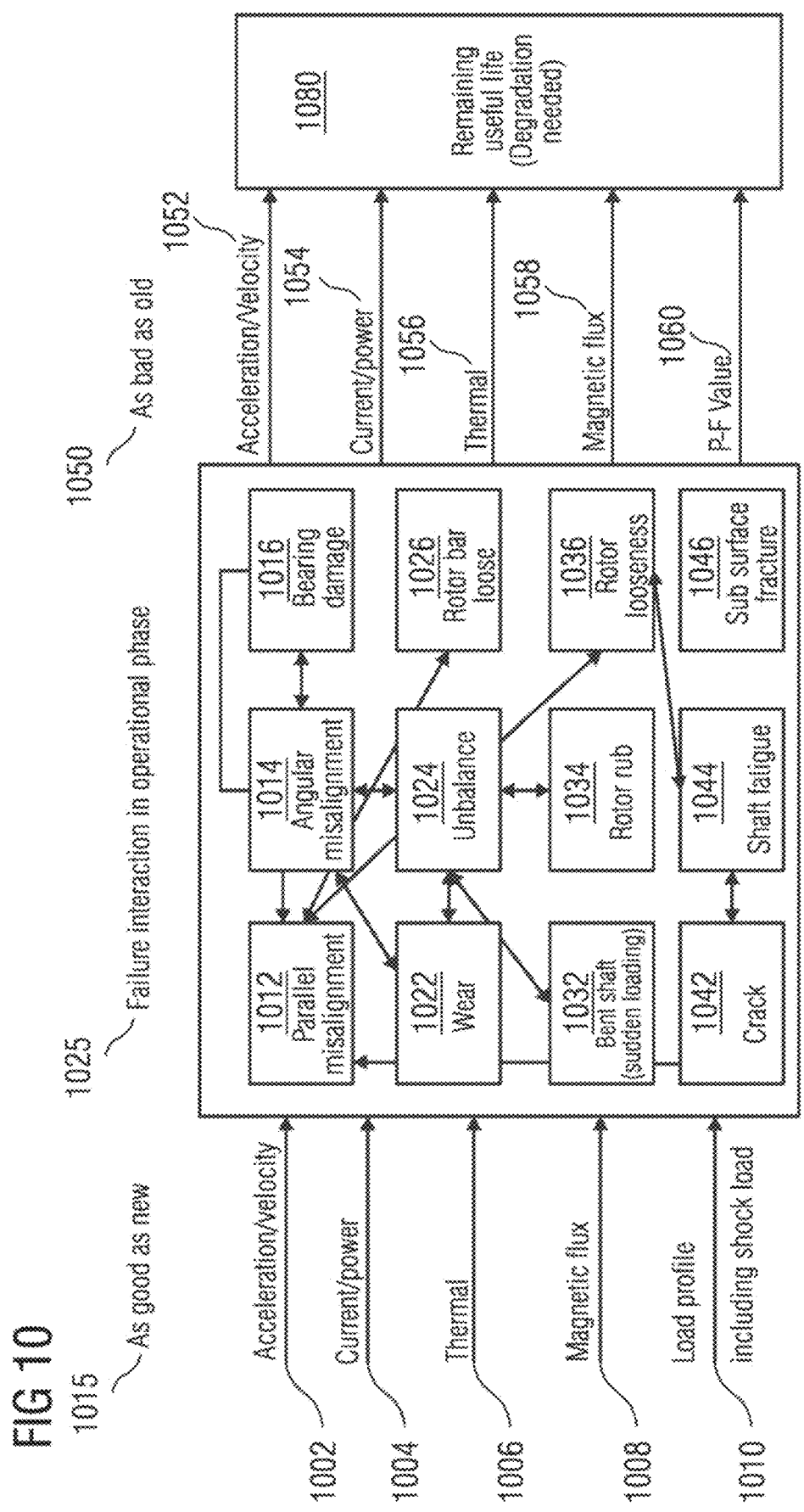

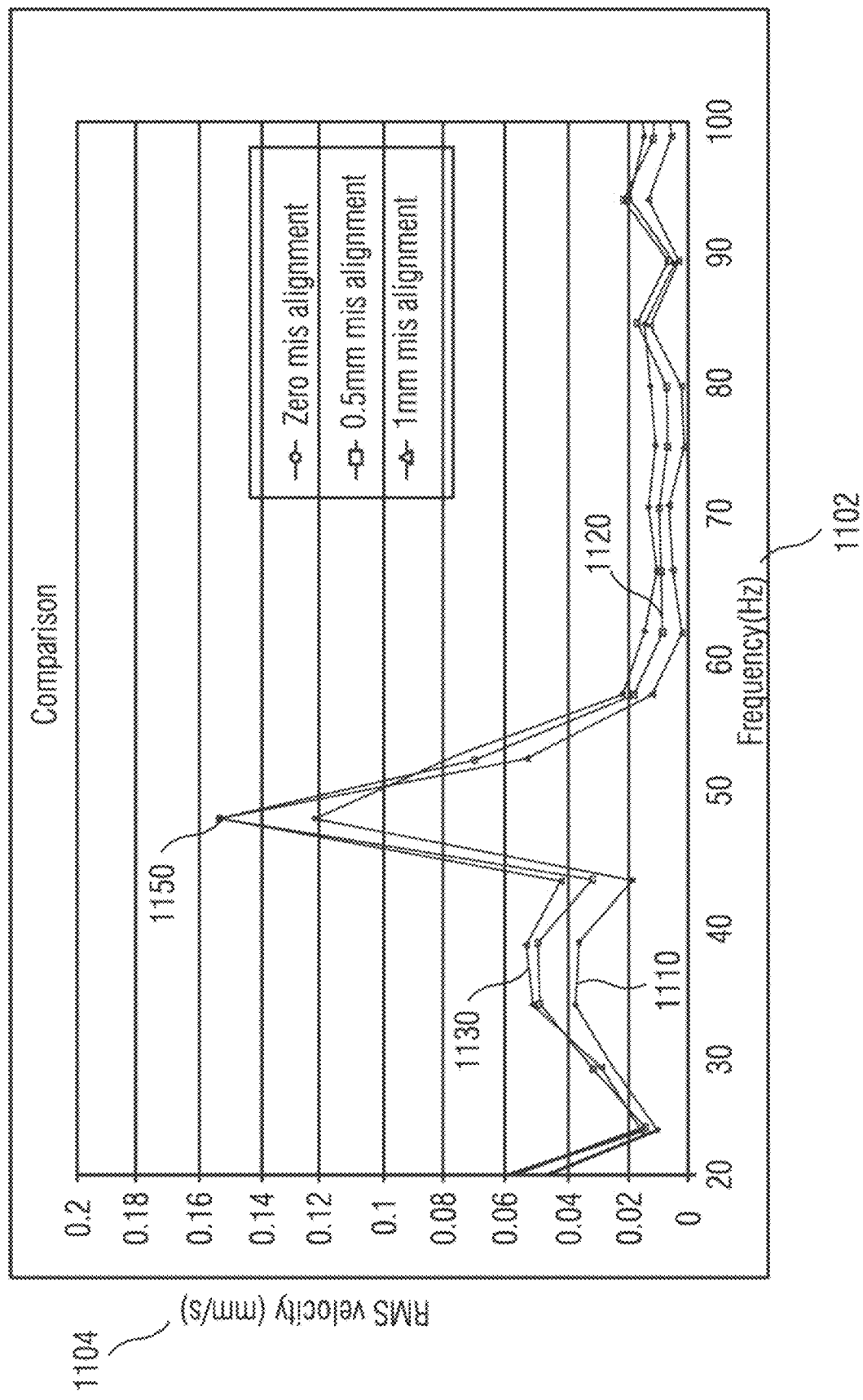

SYSTEM, METHOD AND CONTROL UNIT FOR DIAGNOSIS AND LIFE PREDICTION OF ONE OR MORE ELECTRO-MECHANICAL SYSTEMS

The present patent document is a § 371 nationalization of PCT Application Serial No. PCT/EP2018/076259, filed Sep. 27, 2018, designating the United States, which is hereby incorporated by reference, and this patent document also claims the benefit of European Patent Application No. 17194193.3, filed Sep. 29, 2017, which is also hereby incorporated by reference.

TECHNICAL FIELD

This disclosure relates to monitoring and controlling operation of an electro-mechanical system in real-time.

BACKGROUND

Electro-mechanical systems during operation experience failure due to fatigue or creep or fracture caused by either external impact or internal structural weakness. The failure leads to damage of surface integrity, geometry, or internal structure. If the failure is not detected at an early stage, the electro-mechanical systems may lead to system shutdown and unscheduled maintenance.

Monitoring operation of electro-mechanical systems is used for failure detection and diagnostics. The monitoring is performed by generating models for the electro-mechanical system. Such a method is disclosed with respect to turbines in the document U.S. Patent Application Publication No. 2011/0137575. The method disclosed therein uses only principles of engineering physics to perform the diagnosis. The physics-based model is limited as the accuracy of the model is not validated. Accordingly, such methods are unable to diagnose the electro-mechanical performance over time and therefore, are unable to accurately predict maintenance and down-time of the electro-mechanical systems. Further, the models are not scalable to multiple electro-mechanical systems, which make determination of reliability of the multiple electro-mechanical system difficult.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an object of the present disclosure to accurately model the electro-mechanical systems for accurate diagnosis and life prediction of the electro-mechanical systems individually and in combination.

The method, device, and system achieve the aforementioned object by determining a system response associated with the failure modes of the electro-mechanical system from the sensor data. A simulated response associated with the failure modes of the electro-mechanical system is received. Based on the simulated response and the system response, a hybrid model of the electro-mechanical system is generated offline and in real-time. A diagnosis of operation of the electro-mechanical system is generated based on the hybrid model. The hybrid model combines the system response and the at least one simulated. Further, a life trend of the electro-mechanical system is predicted based on the diagnosis, which follows degradation principle.

According to a first aspect, a method of diagnosis and life prediction of an electro-mechanical system is provided. As used herein, "electro-mechanical system" refers to systems or devices that convert electrical energy into mechanical movement or vice versa. The electro-mechanical system may include one or more components. In an exemplary embodiment, the electro-mechanical system is an electric motor.

Further, the term "diagnosis" refers to monitoring operation of the electro-mechanical system to determine failure or fault in the electro-mechanical system. The diagnosis includes identification of the failures in the electro-mechanical system. The failure in the electro-mechanical indicates initiation of degradation of the one or more electro-mechanical system. The diagnosis follows degradation principle associated with the electro-mechanical system. Furthermore, the term "life trend" refers to a trend of life of the electro-mechanical system. The life trend includes life of the electro-mechanical system with and without failure modes. The life trend includes remaining life or remaining useful life (RUL), down-time, maintenance time, etc. Furthermore, the life trend also includes changes in remaining life for different control commands given to the electro-mechanical system for various failure modes.

The method begins with determination of system response associated with failure modes of the electro-mechanical system. The term "failure mode" refers to the ways or modes, in which the electro-mechanical system may fail. Example failure modes include deformation and fracture modes, creep and fatigue of the electro-mechanical system.

Further, the term "system response" refers to a response or reaction by the electro-mechanical system to the failure modes. The system response includes multiple reactions to the failure mode based on sensor data from multiple sensors associated with the electro-mechanical system. In an embodiment, the system response includes image data and video data captured by a capturing device such as a camera. Accordingly, the sensor data is received from the sensors associated with operation of the electro-mechanical system. For example, in an electric motor the system response to fracture failure mode may be determined based on vibration sensor data that indicates higher vibration.

The system response to the failure modes is determined by generating conditions in the electro-mechanical system associated with the failure modes. The system response to the conditions is generated for various profiles, e.g., mission profile. The term "mission profile" refers to capability of the electro-mechanical system over its life. The mission profile includes an operating mission profile and a logistics profile. Accordingly, the mission profile includes parameters that have a bearing on life of the electro-mechanical system such as operating and load profile of the electro-mechanical system and load variability.

A simulated response associated with the failure modes is received. As used herein, the term "simulated response" refers to a response or reaction of a system model to the failure modes. The simulated response includes failure modes are simulated on the system model to determine the simulated response. The failure mode is simulated on a system model of the electro-mechanical system. The failure mode may be simulated by simulating conditions associated with one or more related failures. The simulated response also includes predicted response of the electro-mechanical system based on the sensor data from the sensors associated with the electro-mechanical system.

The term "system model" refers to a simulated model based on physics of the electro-mechanical system that is continuously updated with the real-time sensor data and data-driven predictive intelligence. Therefore, the system model is a high-fidelity simulation model of the electro-mechanical system that is generated based on Finite Element Analysis, Failure Mode and Effect analysis, Bayesian calibration, Neural Networks, etc. The system model includes failure model for the failure modes, degradation model, etc. The system model also includes virtual sensor data associated with the sensors in the electro-mechanical system.

In an embodiment, the system model is generated by determining a sensor relationship model for the sensors. In an embodiment, the sensor relationship model is generated based on sensitivity of a sensor with respect to changes in remaining sensors associated with the electro-mechanical system. The sensitivity is determined by performing a perturbation analysis on the sensors iteratively.

As used herein, "sensor data" and "sensor values" are used interchangeably to mean a representation of one or more datums recorded for one or more operative parameter associated with the electro-mechanical system. The term "operation parameter" refers to one or more characteristics of the electro-mechanical system. For example, if an electric motor is the electro-mechanical system, the operation parameters includes vibration frequency, vibration amplitude, motor temperature, etc.

The sensor relationship model is used to generate virtual operation data associated with one or more components of the electro-mechanical system. The term "virtual operation data" is a simulation of the virtual sensor data based on the sensor relationship model and refers to operation data that is inferred or predicted based on the sensor relationship model and based on control theory. This inference is also known as soft sensing or proxy sensing. Accordingly, the system model is built based on a combination of the virtual operation data, physics-based models and data-driven models.

According to an embodiment, the system model is generated for an electro-mechanical system such as an induction motor. The simulation response is prepared for failure modes such as zero misalignment, 0.5 mm misalignment, and 1 mm misalignment.

The simulation response is captured in as a graph with the x-axis indicating frequency and the y-axis indicating root mean square (RMS) velocity (mm/sec). The RMS velocity indicates vibration amplitude in terms of velocity. In the present embodiment, the simulation response indicates that the vibration amplitude changes twice due to misalignment. The simulated response is validated by comparing the simulated response with the system response.

Accordingly, in this act, the system model of the electro-mechanical system is generated and validated based on the sensor data from the sensors. Further, the system model is updated with the sensor data from the sensors to reflect a current state of the electro-mechanical system. The term "current state" refers to the sensor data that reflects performance and operation conditions of the electro-mechanical system at a given instant.

A hybrid model of the electro-mechanical system is generated in real-time based the system response and the validated simulated response. As used herein, the term "hybrid model" refers to a model of the electro-mechanical system that is a combination of real-time sensor data and validated system model of the electro-mechanical system. Thus, the hybrid model not only leverages the strengths of the data-driven and the physics-based approaches but, validates the system model based on the real-time sensor data.

The hybrid model may also be referred to as a validated high-fidelity digital twin of the electro-mechanical system that is capable of analyzing operation and performance of the electro-mechanical system at a given time instant. The term "digital twin" is refers to as a multi-physics, multiscale, probabilistic simulation of the electro-mechanical system that uses the physical based models, sensor data, fleet history, etc., to act like a virtual twin the electro-mechanical system. In the present embodiment, the hybrid model is generated in real-time and therefore, does not require data analytics based on historical sensor data.

The hybrid model is used to generate a diagnosis of the electro-mechanical system. The term "diagnosis" refers to monitoring operation of the electro-mechanical system to determine failure or fault in the electro-mechanical system. The hybrid model is used to determine an anomaly in the performance of the electro-mechanical system. In an embodiment, the diagnosis also includes determining an optimal sensor position for the sensors based on the hybrid model. The optimal sensor position is determined by comparing the virtual sensor data and the sensor data from the electro-mechanical system. Accordingly, the optimal sensor position validating is based on the system model of the electro-mechanical system.

According to an embodiment, optimum sensor location for an electro-mechanical system including a motor, a gearbox, a load, and a shaft is determined. The load includes a nylon rope, which is a provision for applying load. The electro-mechanical system may be cumulatively referred to as motor-drive train.

A system model of the motor-drive train is generated based on physics principles. The system model is continuously updated with the real-time sensor data from sensors monitoring operation of the motor-drive train. The system model includes component models for components of the electro-mechanical system, such as motor model, gear model, etc. Accordingly, the system model is capable of simulating interaction between the component models.

The motor-drive train is fixed at motor constraint location to a housing. The housing includes a platform, fixed to the housing at platform constrain location. Further, the load is also fixed to the platform of the housing at load constraint location. The system model of the motor-drive train is generated with similar constraint locations. In an embodiment, impact of the motor constraint location, the platform constraint location and the load constraint location on misalignment is determined based on a hybrid model built for the motor-drive train.

In an embodiment, the determination of the optimum sensor location is done by simulating various failure modes in the system model and the motor-drive train. Various versions of the system model are generated with differing virtual sensor locations. The various versions of the system model are used to generate simulation response. The simulation response is compared with the system response of the motor-drive train to determine the version of the system model with most accurate response measurement by the virtual sensor. Accordingly, the location of the virtual sensor will be determined as the optimum sensor location.

According to another embodiment, a pre-determined torque is applied to the motor of the motor-drive train. The pre-determined torque is applied by adding associated weight at a mid-span of the shaft. Similarly, the system model will be input with a simulation of the pre-determined torque on the motor model. The system response to the pre-determined torque and the simulation response from the system model are used to tune the hybrid model of the motor-drive train. The hybrid model compares sensor data from the electro-mechanical system and virtual sensor data from the system model. Further, the optimum sensor location is determined based on whether the location of the sensor enables prompt diagnosis of the motor-drive train. Accordingly, the optimum sensor location is at a location where the simulation response is measured most accurately.

The diagnosis of the electro-mechanical system is used to determine a life trend of the electro-mechanical system. The term "life trend" refers to a trend of life of the electro-mechanical system. The life trend includes life of the electro-mechanical system with and without failure modes. Further, the life trend includes remaining life or remaining useful life (RUL), down-time, maintenance time, etc. Furthermore, the life trend also includes changes in remaining life for different control commands given to the electro-mechanical system associated with various failure modes.

In an embodiment, one or more failures in the electro-mechanical system are detected based on the hybrid model. The life trend of the electro-mechanical system, prior and post the failures, is determined. The life trend may be calculated as below.

For example, the electro-mechanical system begins operation at time 0 and is still operating at time t with failure at time T. The probability that the electro-mechanical system will survive an additional interval of length τ is calculated based on the below equation:

$$R(\tau | t) = P(T > t + \tau | T > r) = \frac{P(T > t + \tau)}{P(T > t)} = \frac{R(t + \tau)}{R(t)}$$

Where R is the conditional reliability function, P is the probability of failure.

The RUL at age t is calculated using the below equation:

$$RUL(t) = \int_0^\infty R(\tau | t) = \frac{1}{R(t)} \int_t^\infty R(\tau) d\tau$$

Therefore, the RUL is used to predict performance of the electro-mechanical system.

According to an embodiment, a further failure in the electro-mechanical system is predicted based on the predicted performance. The term "further failure" refers to a failure that may take place subsequent to a first failure that was used to determine the RUL. The further failure is predicted by comparing the predicted performance of the electro-mechanical system and predicted performance of the system model. Therefore, the present disclosure is advantageous as it is able to predict potential failure of the electro-mechanical system.

According to another embodiment, a control command is generated based on the predicted further failure of the electro-mechanical system. The control command includes change in input parameters, reduction in load, information regarding back-up to a controller of the electro-mechanical system, etc. Therefore, the present disclosure enables automatic intelligent decisions to be taken promptly on a shop floor of an industrial automation environment or on the electro-mechanical system itself.

According to a second aspect, the hybrid model generated may be used to determine the life trend and also predict life trend of the electro-mechanical systems. The hybrid model may also be used to generate a fleet reliability and a fleet availability. A method of diagnosis and life prediction of multiple electro-mechanical systems is provided. Herein, after the term "fleet" is used to refer to the multiple electro-mechanical systems.

The method includes generation of a system model for a first electro-mechanical system based on a multi-physics model. The system model is validated based on sensor data from sensors associated with operation of the first electro-mechanical system. Further, a hybrid model of the first electro-mechanical system in real-time based on a system response of the first electro-mechanical system and a simulated response of the system model for one or more failure modes.

The hybrid model associated with the first electro-mechanical system is applied to each of remaining electro-mechanical systems of the fleet. The hybrid model may be applied iteratively or cumulatively to the remaining electro-mechanical systems. Further, the fleet includes electro-mechanical systems with different characteristics and capabilities, such as different mission profiles, additional sensors, etc. The hybrid model is scaled in a manner to adapt to the characteristic of the mission profiles and to the additional sensor data.

The method further includes identifying presence of failure in the fleet of electro-mechanical systems based on the application of the hybrid model on the fleet of electro-mechanical systems. The failure is identified by comparing the applied hybrid model and the sensor data from the fleet of electro-mechanical systems. In an embodiment, the electro-mechanical system is an electric motor and the failure identified includes misalignment. The hybrid model further enables identification of the fault as one of an angular misalignment or bent shaft related misalignment, etc.

The hybrid model also enables isolation of the failure to one or more faulty electro-mechanical systems. The hybrid model identifies the faulty electro-mechanical system based on system response of the faulty electro-mechanical system. The system response may include deviation in parameters such as vibration, temperature, voltage, current or magnetic flux, which is compared with the hybrid model. The comparison is used to isolate the faulty electro-mechanical system.

A fleet response and a simulated fleet response are monitored. The simulated fleet response is the simulated response of the fleet of electro-mechanical systems based on application of the hybrid model on the fleet of electro-mechanical systems. The fleet response and the simulated fleet response are used to determine a fleet degradation for the fleet of electro-mechanical systems.

Further, a fleet reliability is predicted based on the fleet degradation. As used herein "fleet reliability" refers to the ability of the fleet to perform under given conditions for a given time interval. Fleet reliability also includes the probability of the fleet being able to perform as required under given conditions for the time interval. Further, a fleet diagnosis associated with the operation of the fleet of electro-mechanical systems is generated based on the fleet reliability.

In an embodiment, the fleet reliability is predicted using a utilization vector that indicates the operation hours of the electro-mechanical system. Further, the Reliability Performance Index (RPI) is determined to allow the quantification of the fleet of electro-mechanical systems reliability during design and configuration selection. In another embodiment, the fleet reliability is determined as a function of inherent reliability and operating reliability. The operating reliability changes when the failure occurs.

Furthermore, a failure simulation associated with the failure is generated. In certain examples, the failure is the failure detected in the faulty electro-mechanical system. In another embodiment, the failure includes a further failure that is predicted for the fleet of electro-mechanical systems. The failure simulation includes fatigue simulation, fracture simulation, and wear simulation.

Accordingly, based on the failure simulation, a fleet life trend is determined for the fleet of electro-mechanical systems. Further, the fleet life trend includes a remaining life trend of the fleet of electro-mechanical systems. Furthermore, a fleet availability of the fleet of electro-mechanical systems is determined based on the fleet life trend. The term "fleet availability" refers to the ability of the fleet to be in a state to perform as required and is a measure of the time the item is in an operable state when compared to elapsed calendar time. In an embodiment, the fleet availability is represented mathematically by:

$$\text{Availability} = \frac{\text{Operating time}}{\text{Operating time} + \text{Down time}}$$
$$= \frac{\text{Mean time between failures } (MTBF)}{MTBF + \text{Mean time to recover } (MTTR)}$$

Based on the fleet life trend and the fleet availability, inspection interval of the fleet and back-up for the fleet is optimized. In addition, a Potential-to-Failure (P-F) interval is determined based on the fleet life trend and fleet availability. The term "P-F interval" refers to the interval between a detectable symptom or warning sign (a potential failure) that a functional failure is in the process of occurring to the actual functional failure.

According to an embodiment, the method of diagnosis and life prediction of a fleet of electro-mechanical system may be divided into two stages the Diagnosis stage and the Prediction stage.

The Diagnosis stage includes the acts of failure identification/detection and failure isolation and differentiation. The hybrid model for an electro-mechanical system is generated and applied to the fleet. The failure such as misalignment, shaft bending, loose rotor bar, wear, etc., is detected for in the fleet. A faulty electro-mechanical system is determined from the fleet. Also, the type of failure and its characteristics are determined. Scaling up of the hybrid model is performed for the fleet, grouping similar system response from the fleet before the Prediction stage.

The Prediction stage includes simulation of the failure on the fleet of electro-mechanical systems to determine a fleet reliability and a fleet life trend. Further, the fleet reliability and fleet life trend is used as a decision support system that is used generate a control command that in case of future failure/further failure. The decision support system refers to a system that determines the procedure to operate the fleet such that back-up may be optimized. Further, the decision support system optimizes inspection intervals and power so the further failure may be delayed. In an embodiment, the decision support system determines vibration at bearing inner race by using the "soft sensor" technique.

Further, in the Prediction stage a fleet availability is determined based on the fleet life trend. A P-F interval is further determined based on the fleet life trend and fleet availability. The fleet reliability, fleet life trend, and fleet availability are displayed on via a Graphical User Interface.

According to a third aspect, a control unit for diagnosis and life prediction of an electro-mechanical system is provided. The electro-mechanical system includes multiple sensors that measure operation parameters of the electro-mechanical system. The term "operation parameter" refers to one or more characteristics of the electro-mechanical system. For example, if an electric motor is the electro-mechanical system, the operation parameters includes vibration frequency, vibration amplitude, engine temperature, etc. Further, the electro-mechanical system includes a controller with a trans-receiver capable of connecting to a network interface.

In an embodiment, the controller receives sensor data from the sensors and transmits the sensor data to the control unit via the network interface. In another embodiment, the controller performs the functions of the control unit.

The control unit includes a communication unit, at least one processor, a display, a Graphical User Interface (GUI), and a memory communicatively coupled to each other. The communication unit includes a transmitter, a receiver, and Gigabit Ethernet port. The memory may include 2 Giga byte Random Access Memory (RAM) Package on Package (PoP) stacked and Flash Storage. The memory is provided with modules stored in the form of computer readable instructions. The processor is configured to execute the defined computer program instructions in the modules. Further, the processor is configured to execute the instructions in the memory simultaneously. The execution of the modules may also be performed using co-processors such as Graphical Processing Unit (GPU), Field Programmable Gate Array (FPGA), or Neural Processing/Compute Engines. The display includes a High-Definition Multimedia Interface (HDMI) display and a cooling fan.

According to an embodiment, the control unit may be an edge computing device, personal computing device, a workstation, a client device, a network enabled computing device, any other suitable computing equipment, and combinations of multiple pieces of computing equipment. As used herein, "edge computing" refers to computing that is capable of being performed by an edge device, which is a compact computing device that has a small form factor and resource constraints in terms of computing power.

In an embodiment, the control unit is configured on a cloud computing-based platform on a cloud computing environment, implemented as a service for analyzing data. As used herein, "cloud computing" refers to a processing environment including configurable computing physical and logical resources, for example, networks, servers, storage, applications, services, etc., and data distributed over the network, for example, the internet. The cloud computing environment provides on-demand network access to a shared pool of the configurable computing physical and logical resources. The network is, for example, a wired network, a wireless network, a communication network, or a network formed from any combination of these networks.

Additionally, control personnel may access the control unit via the GUI. The GUI is, for example, an online web interface, a web based downloadable application interface, etc.

The processor executes a system response module, a simulation response module, a hybrid model generator, a diagnosis module, a life module, a failure detection module, a prediction module, and a sensor module. The execution of the modules is in accordance with the method disclosed in the first aspect.

The control unit is advantageous as it is capable of performing the diagnosis and life prediction of the electro-mechanical system without any historical sensor data associated with the operation of the electro-mechanical system.

Further, the simulation response and the system response are calibrated at the same place to provide prompt diagnosis of the electro-mechanical system.

According to an embodiment, a system for of diagnosis and life prediction of an electric motor is provided. The electric motor includes a vibration sensor and a thermostat.

The system includes a simulation platform with the system model, the control unit, and a display device. The control unit is placed on the electric motor or in close proximity. The system response is generated by the electric motor and a simulated response is generated by the simulation platform. In other words, the system model on the simulation platform is used to generate the simulated response associated with the electric motor. The control unit receives the simulated response at the simulation response module and the system response at the system response module. The simulated response is validated at the model validation module. The simulated response is validated for various failure modes and mission profiles.

Based on the validation, the control unit diagnosis the electric motor and predicts the life trend of the electric motor. The life trend is displayed by a GUI on the display device. In an embodiment, the GUI displays the life trend as a graph of time versus performance of the electric motor. The performance includes predicted performance when a failure occurs and remaining life trend prior and post the failure.

According to another embodiment, remaining life (e.g., RUL) for an electric motor is shown in the form of a graph. The y-axis indicates mean life in hours and the x-axis shows remaining hours of operation. The control unit as predicts remaining life of the electric motor. Accordingly, the control unit displays suggestions to an operator to reduce speed of the electric motor if there is a requirement of extending the remaining life. For example, if there is a lack of available back-up, the electric motor will be required to have extended remaining life and accordingly needs to be run at a reduced power.

According to yet another embodiment, failure identification in an induction motor is performed. In an embodiment, the induction motor is a 3 phase AC induction motor with power rating of 5.5 kW with a motor speed of 1450 RPM, having voltage of 415+/−10%. The induction motor is coupled to a load by a coupler. Alignment of the induction motor and the load is indicated by a dotted line. The alignment may be tabulated by a graph and a table.

The graph indicates misalignment through vibration measurement. On the x-axis, motor operation frequency is provided, and on the y-axis, root mean square (RMS) velocity is provided in terms of mm/sec. The RMS velocity indicates vibration amplitude in terms of velocity. The graph indicates a frequency at which the rms velocity is the highest.

In addition to the graph, the table with various vibration amplitude scenarios and corresponding status are provided. The control unit associated with the induction motor determines the misalignment by determining the 2× vibration amplitude. For example, where 2 times the vibration amplitude is below 50% of 1 times the operating frequency (i.e., 2× vibration amplitude<1× frequency), the status is normal. If 2 times vibration amplitude is between 50%-150% of 1 times the operating frequency, then the status is severe. If the 2 times vibration amplitude is greater than 150% of 1 times the operating frequency, then the induction motor needs to be stopped.

According to another embodiment, the table for failure identification in the electro-mechanical system includes the type of failure and associated image. For example, in is misalignment failure mode and the type of misalignment includes angular misalignment, parallel misalignment and combination misalignment.

The table also indicates phase of the misalignment. For example, axial phase shift of 180°, radial direction phase shift of 180° and axial-radial position 180° phase shift. Further, the table indicates image associated with the types of misalignment. The control unit associated with the electro-mechanical system is capable of determining the type of misalignment and the phase based on the table.

According to another embodiment, an interaction matrix of a failure model in an electro-mechanical system is generated. As used herein, "failure model" refers to a simulation model that analyzes operation parameters and sensor data of the electro-mechanical system to predict the failure modes. The failure model is part of the system model.

In an embodiment, the electro-mechanical system is an integrated drive system. The matrix indicates three main operation phases: "as good as new" phase, operation phase, and "as bad as old" phase. The "as good as new" phase is referred as first phase and the "as bad as old" phase is referred to as last phase hereinafter.

Parameters at the first phase are monitored at the last phase to determine a degradation model of the electro-mechanical system. In the first phase, the parameters include motor acceleration/velocity, motor current/power, motor temperature, magnetic flux and load profile including shock load. The load profile is based on demand and is also referred to mission profile.

In an embodiment, the failures modes include parallel misalignment, angular and combination misalignment, bearing damage, wear, unbalance, rotor bar loose, bent shaft through sudden loading, rotor rub, rotor looseness, crack, shaft fatigue, and sub surface fracture.

In the present embodiment, rotor bar loose and rotor looseness impact parallel alignment and vice versa. Further, the parallel alignment is impacted by failure through crack and angular and combination misalignment. This is similarly seen for angular and combination misalignment, which is impacted by wear, unbalance and bearing damage, and vice versa. The failure though wear is impacted by unbalance. While, failure through unbalance is impacted by wear, bent shaft, and rotor rub. The interaction is similarly generated for all failure modes.

The failure interaction during the operation phase is output in terms of change in the parameter values of motor acceleration/velocity, motor current/power, motor temperature, magnetic flux, and potential to failure value. The output of the failure interaction is used to determine remaining life and generate a degradation model.

According to a fourth aspect, system for of diagnosis and life prediction of multiple electro-mechanical systems is provided. The system includes a server and a network interface communicatively coupled to the server. In an embodiment, the system includes sensors associated with the electro-mechanical systems communicatively coupled to the server via the network interface. The system also includes one or more control units communicatively coupled to the server.

The server includes a communication unit, a processing unit, and a memory. The memory is configured to store computer program instructions defined by modules, for example, failure identification module. In an embodiment, the server may also be implemented on a cloud computing environment, where computing resources are delivered as a service over the network.

The processing unit of the server executes the modules including failure identification module, failure isolation module, failure classification module, fleet diagnosis module, fleet life module, fleet monitoring module, fleet degradation module, reliability module, failure simulation module, availability module, and maintenance module.

On execution, failure identification module identifies presence of one or more failures in the electro-mechanical systems based on the hybrid model determined by the hybrid model generator of the control unit. The failure isolation module identified a faulty electro-mechanical system of the electro-mechanical system with the one or more failure. Further, the failure classification module classifies the one or more failure based on a system response and a simulated response associated with the faulty electro-mechanical system.

The processing unit executed the fleet diagnosis module to generate a fleet diagnosis associated with operation of the electro-mechanical systems based on the hybrid model. Further, the fleet life module is used to predict a fleet life trend of the electro-mechanical systems based on the fleet diagnosis. Furthermore, the fleet monitoring module monitors a fleet response and a simulated fleet response of the electro-mechanical systems based on application of the hybrid model on the electro-mechanical systems.

The fleet degradation module determines a fleet degradation for the electro-mechanical systems based on the fleet response and the simulated fleet response. Further, a remaining life trend of the electro-mechanical systems is generated based on the fleet degradation. The reliability module predicts a fleet reliability based on the fleet degradation. The fleet life module is configured to determine the fleet life trend of the plurality of electro-mechanical systems based on the fleet reliability and the remaining life trend of the electro-mechanical systems.

The memory further includes the failure simulation module to predict a failure simulation associated with the one or more failure. The failure simulation includes fatigue simulation, fracture simulation, and wear simulation. The fleet life module determined the remaining life trend based on the fatigue simulation. Furthermore, an availability module determines a fleet availability of the electro-mechanical systems based on the fleet life trend. Also, the maintenance module predicts the P-F interval and optimizes inspection interval and management of back-up for the electro-mechanical systems based on the fleet availability.

According to an embodiment, stages to analyze fleet reliability for multiple induction motors, is provided. Each of the induction motors are provided with a control unit. The sensors on the induction motors are capable of communicating sensor data to control units associated with the induction motors via a wireless network interface. The operation of the induction motors is monitored by a control server.

In the first stage of fleet reliability, mission profiles and failure modes are learnt on a test induction motor. In an embodiment, the test induction motor is used to build a hybrid model. The hybrid model is built by a control unit associated with the test induction motor. To build the hybrid model, the control unit generates a system model and performs simulation for with various mission profiles with different defects like rotor bar loose, rotor unbalance, bearing defects, uneven air gap, misalignment of the rotor shaft with external load and loose foundation, etc. A system response is captured by sensors in the test induction motor. A simulated response is generated from the system model and validated by the control unit.

The control unit is capable of understanding the mission profiles of the test induction motor. The control unit determines the simulation response from the system model when there is no failure. The simulated response is validated by the system response of the test induction motor. The system model of the test induction motor is suitably modified for the remaining induction motors.

The hybrid model generated by the control unit of the test induction motor is then communicated to control units via a wireless network interface. The hybrid model applied in the control units in the remaining induction motors to teach the scenarios with no failure. Accordingly, the second stage is a teaching stage where the hybrid model learnt at the first stage is used to teach the remaining induction motors. Further, at the third stage the hybrid model applied to the induction motors is capable of performing diagnosis and life prediction of the induction motors individually and in combination.

In an embodiment, the system response to failure modes in induction motors is cumulatively analyzed for fleet reliability, fleet life trend and fleet availability. Further, the fleet reliability, the fleet life trend and the fleet availability are displayed on the control server by the wireless network interface.

Therefore, the present disclosure is advantageous as it will eliminate experts for interpreting performance of the electro-mechanical system. Diagnosis and life prediction through this disclosure may be used by the operating personnel to optimize spare parts requirements.

BRIEF DESCRIPTION OF THE DRAWINGS

The above-mentioned and other features of the disclosure will now be addressed with reference to the accompanying drawings. The illustrated embodiments are intended to illustrate, but not limit the disclosure.

The present disclosure is further described hereinafter with reference to illustrated embodiments shown in the accompanying drawings, in which:

FIG. 2 illustrates a block diagram of a control unit for diagnosis and life prediction of an electro-mechanical system, according an embodiment.

FIG. 8 illustrates failure identification in an electro-mechanical system, according to an embodiment.

FIG. 9 is a table failure identification in the electro-mechanical system in FIG. 8.

FIG. 10 is an interaction matrix illustrating interaction of failure in an electro-mechanical system, according to an embodiment.

FIG. 11 illustrates simulated response of a system model, according to an embodiment.

DETAILED DESCRIPTION

Figure 1A:
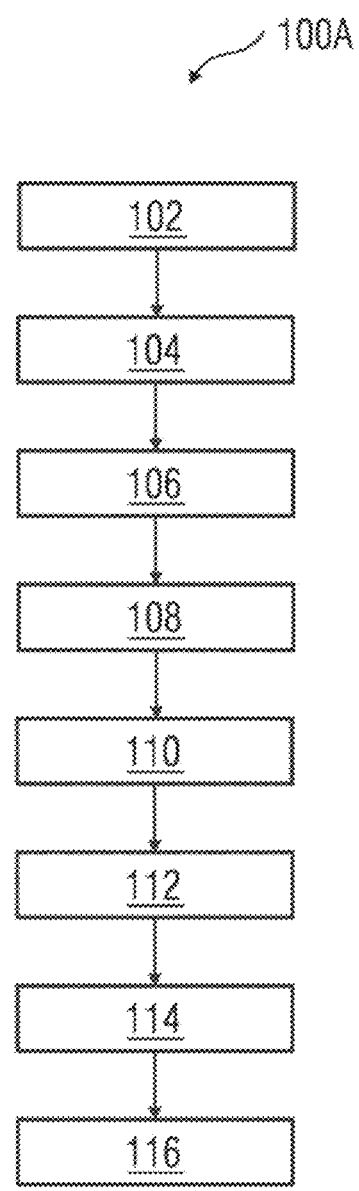
FIG. 1A is a flowchart illustrating a method of diagnosis and life prediction of an electro-mechanical system, according an embodiment.

Various embodiments are described with reference to the drawings, wherein like reference numerals are used to refer to like elements throughout. In the following description, a large gas turbine has been considered as an example of a technical system for the purpose of explanation. Further, numerous specific details are set forth in order to provide thorough understanding of one or more embodiments. These examples must not be considered to limit the application to large gas turbine and includes any technical system that is capable of overcoming limitation of the sensors. It may be evident that such embodiments may be practiced without these specific details.

FIG. 1A is a flowchart illustrating a method 100A of diagnosis and life prediction of an electro-mechanical system. As used herein, "electro-mechanical system" refers to systems or devices that convert electrical energy into mechanical movement or vice versa. The electro-mechanical system may include one or more components. In an exemplary embodiment, the electro-mechanical system is an electric motor.

Further, the term "diagnosis" refers to monitoring operation of the electro-mechanical system to determine failure or fault in the electro-mechanical system. Furthermore, the term "life trend" refers to a trend of life of the electro-mechanical system. The life trend includes life of the electro-mechanical system with and without failure modes. Further, the life trend includes remaining life or remaining useful life, down-time, maintenance time, etc. Furthermore, the life trend also includes changes in remaining life for different control commands given to the electro-mechanical system for various failure modes.

The method 100A begins with the act of determining system response associated with failure modes of the electro-mechanical system, at act 102. The term "failure mode" refers to the ways or modes in which the electro-mechanical system may fail. Example failure modes include deformation and fracture modes, creep, and fatigue of the electro-mechanical system.

Further, the term "system response" refers to a response or reaction by the electro-mechanical system to the failure modes. The system response includes multiple reactions to the failure mode based on sensor data from multiple sensors associated with the electro-mechanical system. In an embodiment, the system response includes image data and video data captured by a capturing device such as a camera. Accordingly, at act 102, the sensor data is received from the sensors associated with operation of the electro-mechanical system. For example, in an electric motor the system response to fracture failure mode may be determined based on vibration sensor data that indicates higher vibration.

The system response to the failure modes is determined by generating conditions in the electro-mechanical system associated with the failure modes. The system response to the conditions is generated for various profiles, e.g., mission profile. The term "mission profile" refers to capability of the electro-mechanical system over its life. The mission profile includes an operating mission profile and a logistics profile. Accordingly, the mission profile includes parameters that have a bearing on life of the electro-mechanical system such as operating and load profile of the electro-mechanical system and load variability.

At act 104, a simulated response associated with the failure modes is received. As used herein, the term "simulated response" refers to a response or reaction of a system model to the failure modes. The simulated response includes failure modes are simulated on the system model to determine the simulated response. The failure mode may be simulated by simulating conditions associated with one or more related failures. The simulated response also includes predicted response of the electro-mechanical system based on the sensor data from the sensors associated with the electro-mechanical system.

The term "system model" refers to a simulated model based on physics of the electro-mechanical system that is continuously updated with the real-time sensor data and data-driven predictive intelligence. Therefore, the system model is a high-fidelity simulation model of the electro-mechanical system that is generated based on Finite Element Analysis, Bayesian calibration, Neural Networks, etc. The system model includes virtual sensor data associated with the sensors in the electro-mechanical system.

In an embodiment, the system model is generated by determining a sensor relationship model for the sensors. In an embodiment, the sensor relationship model is generated based on sensitivity of a sensor with respect to changes in remaining sensors associated with the electro-mechanical system. The sensitivity is determined by performing a perturbation analysis on the sensors iteratively.

As used herein, "sensor data" and "sensor values" are used interchangeably to mean a representation of one or more datums recorded for one or more operative parameter associated with the electro-mechanical system. The sensor data is indicative of the at least one failure mode of the electro-mechanical system. The term "operation parameter" refers to one or more characteristics of the electro-mechanical system. For example, if an electric motor is the electro-mechanical system, the operation parameters includes vibration frequency, vibration amplitude, motor temperature, etc.

The sensor relationship model is used to generate virtual operation data associated with one or more components of the electro-mechanical system. The term "virtual operation data" refers to operation data that is inferred or predicted based on the sensor relationship model and based on control theory. This inference is also known as soft sensing or proxy sensing. Accordingly, the system model is built based on a combination of the virtual operation data, physics-based models and data-driven models.

At act 106, the simulated response is validated by comparing the simulated response with the system response. Accordingly, in this act, the system model of the electro-mechanical system is generated and validated based on the sensor data from the sensors. Further, the system model is updated with the sensor data from the sensors to reflect a current state of the electro-mechanical system. The term "current state" refers to the sensor data that reflects performance and operation conditions of the electro-mechanical system at a given instant.

At act 108, a hybrid model of the electro-mechanical system is generated in real-time based the system response and the validated simulated response. As used herein, the term "hybrid model" refers to a model of the electro-mechanical system that is a combination of real-time sensor data and validated system model of the electro-mechanical system. Thus, the hybrid model not only leverages the strengths of the data-driven and the physics-based approaches but, validates the system model based on the real-time sensor data.

The hybrid model may also be referred to as a validated high-fidelity digital twin of the electro-mechanical system that is capable of analyzing operation and performance of the electro-mechanical system at a given time instant. The term "digital twin" is refers to as a multi-physics, multiscale, probabilistic simulation of the electro-mechanical system that uses the physical based models, sensor data, fleet history, etc., to act like a virtual twin the electro-mechanical system. In the present embodiment, the hybrid model is generated in real-time and therefore, does not require data analytics based on historical sensor data.

At act 110, the hybrid model is used to generate a diagnosis of the electro-mechanical system. The term "diagnosis" refers to monitoring operation of the electro-mechanical system to determine failure or fault in the electro-mechanical system. The hybrid model is used to determine anomaly in the performance of the electro-mechanical system. In an embodiment, diagnosis also includes determining an optimal sensor position for the sensors based on the hybrid model. The optimal sensor position is determined by comparing the virtual sensor data and the sensor data from the electro-mechanical system. Accordingly, the optimal sensor position validating based on the system model of the electro-mechanical system.

At act 112, the diagnosis of the electro-mechanical system is used to determine a life trend of the electro-mechanical system. The term "life trend" refers to a trend of life of the electro-mechanical system. The life trend includes life of the electro-mechanical system with and without failure modes. Further, the life trend includes remaining life or remaining useful life (RUL), down-time, maintenance time, etc. Furthermore, the life trend also includes changes in remaining life for different control commands given to the electro-mechanical system associated with various failure modes.

In an embodiment, one or more failures in the electro-mechanical system are detected based on the hybrid model. The life trend of the electro-mechanical system prior and post the failures, is determined. The life trend may be calculated as below.

For example, the electro-mechanical system begins operation at time 0 and is still operating at time t with failure at time T. The probability that the electro-mechanical system will survive an additional interval of length τ is calculated based on the below equation $$R(\tau|t) = P(T > t + \tau | T > r) = \frac{P(T > t + \tau)}{P(T > t)} = \frac{R(t + \tau)}{R(t)}$$

Where R is the conditional reliability function, P is the probability of failure.

The RUL at age t is calculated using the below equation $$RUL(t) = \int_0^\infty R(\tau|t) = \frac{1}{R(t)} \int_t^\infty R(\tau) d\tau$$

Therefore, the RUL is used to predict performance of the electro-mechanical system.

At act 114, a further failure in the electro-mechanical system is predicted based on the predicted performance. The term "further failure" refers to a failure that may take place subsequent to a first failure that was used to determine the RUL. The further failure is predicted by comparing the predicted performance of the electro-mechanical system and predicted performance of the system model.

At act 116, a control command is generated based on the predicted further failure of the electro-mechanical system. The control command includes change in input parameters, reduction in load, information regarding back-up to a controller of the electro-mechanical system, etc.

Therefore, the hybrid model generated at act 108 may be used to determine the life trend and also predict life trend of the electro-mechanical systems. The hybrid model may also be used to generate a fleet reliability and a fleet availability as indicated in method 100B.

Figure 1B:
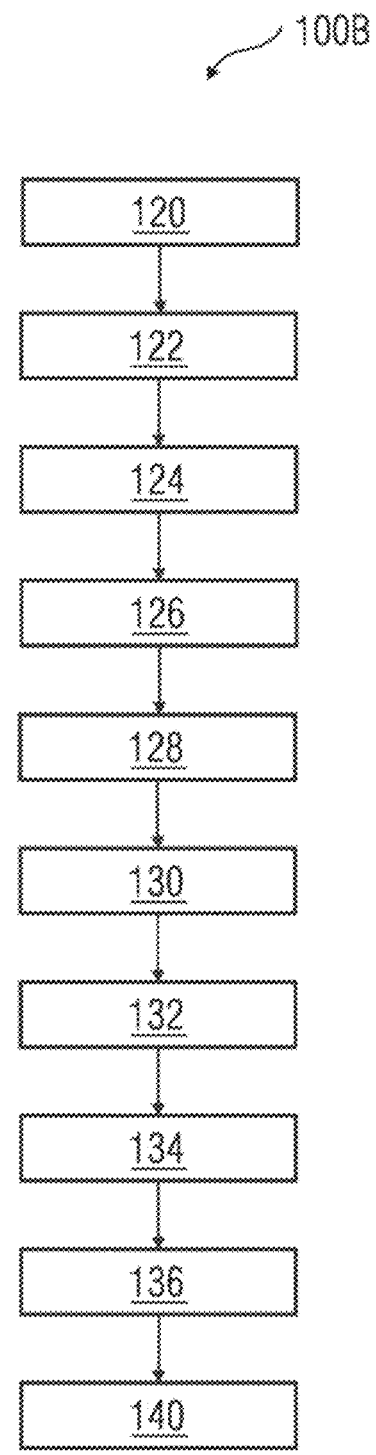
FIG. 1B is a flowchart illustrating a method of diagnosis and life prediction of multiple electro-mechanical systems, according an embodiment.

FIG. 1B is a flowchart illustrating the method 100B of diagnosis and life prediction of multiple electro-mechanical systems. Herein after the term "fleet" is used to refer to the multiple electro-mechanical systems.

At act 120, a system model for a first electro-mechanical system is generated based on a multi-physics model. At act 122, the system model is validated based on sensor data from sensors associated with operation of the first electro-mechanical system. Further, at act 124 a hybrid model of the first electro-mechanical system in real-time based on a system response of the first electro-mechanical system and a simulated response of the system model for one or more failure modes. The acts 120-124 have been elaborated in acts 102-108 in FIG. 1A.

At act 126, the hybrid model associated with the first electro-mechanical system is applied to each of remaining electro-mechanical systems of the fleet. The hybrid model may be applied iteratively or cumulatively to the remaining electro-mechanical systems. Further, the fleet includes electro-mechanical systems with different characteristics and capabilities, such as different mission profiles, additional sensors, etc. The hybrid model is scaled in a manner to adapt to the characteristic of the mission profiles and to the additional sensor data.

At act 128, presence of failure in the fleet of electro-mechanical systems is identified based on the application of the hybrid model on the fleet of electro-mechanical systems. The failure is identified by comparing the applied hybrid model and the sensor data from the fleet of electro-mechanical systems. In an embodiment, the electro-mechanical system is an electric motor and the failure identified includes misalignment. The hybrid model further enables identification of the fault as one of an angular misalignment or bent shaft related misalignment, etc.

At act 130, the hybrid model also enables isolation of the failure to one or more faulty electro-mechanical systems. The hybrid model identifies the faulty electro-mechanical system based on system response of the faulty electro-mechanical system. The system response may include deviation in parameters such as vibration, temperature, voltage, current or magnetic flux, which is compared with the hybrid model. The comparison is used to isolate the faulty electro-mechanical system.

At act 132, a fleet response and a simulated fleet response is monitored. The simulated fleet response is the simulated response of the fleet of electro-mechanical systems based on application of the hybrid model on the fleet of electro-mechanical systems. The fleet response and the simulated fleet response are used to determine a fleet degradation for the fleet of electro-mechanical systems.

At act 134, a fleet reliability is predicted based on the fleet degradation. As used herein, "fleet reliability" refers to the ability of the fleet to perform under given conditions for a given time interval. Fleet reliability also includes the probability of the fleet being able to perform as required under given conditions for the time interval. Further, a fleet diagnosis associated with the operation of the fleet of electro-mechanical systems is generated based on the fleet reliability.

In an embodiment, the fleet reliability is predicted using a utilization vector that indicates the operation hours of the electro-mechanical system. Further, the Reliability Performance Index (RPI) is determined to allow the quantification of the fleet of electro-mechanical systems reliability during design and configuration selection. In another embodiment, the fleet reliability is determined as a function of inherent reliability and operating reliability. The operating reliability changes when the failure occurs.

At act 136, a failure simulation associated with the failure, is generated. The failure in an embodiment is the failure detected in the faulty electro-mechanical system. In another embodiment, the failure includes a further failure that is predicted for the fleet of electro-mechanical systems. The failure simulation includes fatigue simulation, fracture simulation, and wear simulation.

At act 138, based on the failure simulation a fleet life trend is determined for the fleet of electro-mechanical systems. Further, the fleet life trend includes a remaining life trend of the fleet of electro-mechanical systems. The remaining life trend may be determined using the process described in act 112 of method 100A.

At act 140, a fleet availability of the fleet of electro-mechanical systems is determined based on the fleet life trend. The term "fleet availability" refers to the ability of the fleet to be in a state to perform as required and is a measure of the time the item is in an operable state when compared to elapsed calendar time. In an embodiment, the fleet availability is represented mathematically by $$\text{Availability} = \frac{\text{Operating time}}{\text{Operating time} + \text{Down time}}$$
$$= \frac{\text{Mean time between failures } (MTBF)}{MTBF + \text{Mean time to recover } (MTTR)}$$

Based on the fleet life trend and the fleet availability, inspection interval of the fleet and back-up for the fleet is optimized. In addition, a Potential-to-Failure (P-F) interval is determined based on the fleet life trend and fleet availability. The term "P-F interval" refers to the interval between a detectable symptom or warning sign (e.g., a potential failure) that a functional failure is in the process of occurring to the actual functional failure.

Figure 1C:
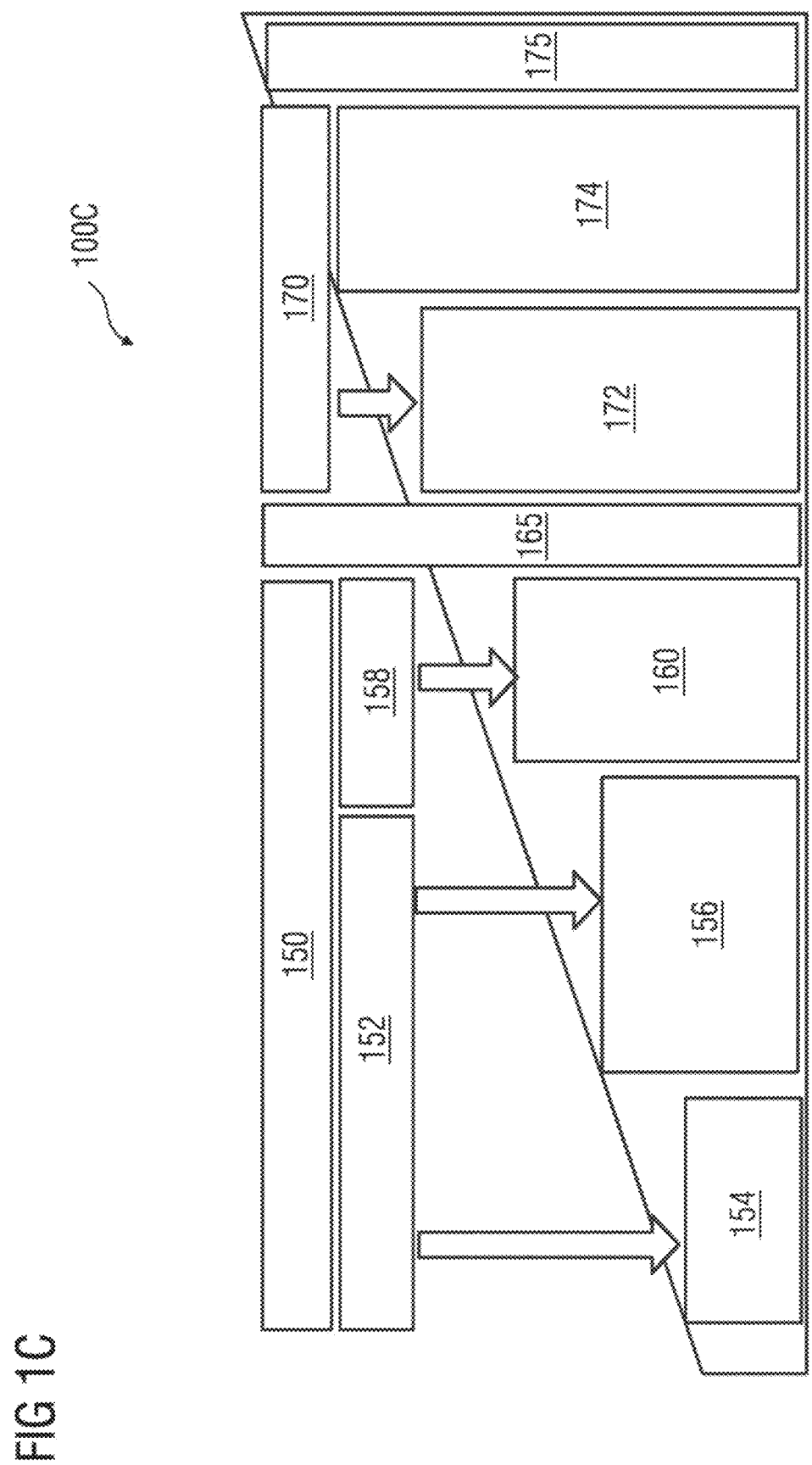
FIG. 1C is a flowchart illustrating a method of diagnosis and life prediction of a fleet of electro-mechanical system, according an embodiment.

FIG. 1C is a flowchart illustrating a method 100C of diagnosis and life prediction of a fleet of electro-mechanical system. The method 100C is divided into two stages the Diagnosis stage 150 and the Prediction stage 170.

The Diagnosis stage 150 includes the acts of failure identification/detection 152 and failure isolation and differentiation 158. At act 154, a hybrid model for an electro-mechanical system is generated and applied to the fleet. At act 156, the failure such as misalignment, shaft bending, loose rotor bar, wear, etc. is detected for in the fleet. At act 160, a faulty electro-mechanical system is determined from the fleet. Also, the type of failure and its characteristics are determined.

At act 165, scaling up of the hybrid model is performed for the fleet, grouping similar system response from the fleet. The Prediction stage 170 includes acts 172 and 174.

At act 172, the failure is simulated on the fleet of electro-mechanical systems to determine a fleet reliability and a fleet life trend. Further, the fleet reliability and fleet life trend is used as a decision support system that is used generate a control command that in case of future failure/further failure. The decision support system refers to a system that determines the procedure to operate the fleet such that back-up may be optimized. Further, the decision support system optimizes inspection intervals and power so the further failure may be delayed. In an embodiment, the decision support system determines vibration at bearing inner race by using the "soft sensor" technique.

At act 174, a fleet availability is determined based on the fleet life trend. A P-F interval is further determined based on the fleet life trend and fleet availability. At act 175, the fleet reliability, fleet life trend, and fleet availability are displayed on via a Graphical User Interface.

FIG. 2 illustrates a block diagram of a control unit 200 for diagnosis and life prediction of an electro-mechanical system 280, according an embodiment.

The electro-mechanical system 280 includes multiple sensors 282, 284, 286, and 288 that measure operation parameters of the electro-mechanical system 280. The term "operation parameter" refers to one or more characteristics of the electro-mechanical system. For example, if an electric motor is the electro-mechanical system, the operation parameters includes vibration frequency, vibration amplitude, engine temperature, etc. Further, the electro-mechanical system 280 includes a controller 290 with a transreceiver 292 capable of connecting to a network interface 250.

In an embodiment, the controller 290 receives sensor data from the sensors 282-288 and transmits the sensor data to the control unit 200 via the network interface 250. In another embodiment, the controller 290 performs the functions of the control unit 200.

The control unit 200 includes a communication unit 202, at least one processor 204, a display 206, a Graphical User Interface (GUI) 208, and a memory 210 communicatively coupled to each other. The communication unit 202 includes a transmitter, a receiver and Gigabit Ethernet port. The memory 210 may include 2 Giga byte Random Access Memory (RAM) Package on Package (PoP) stacked and Flash Storage. The memory 210 is provided with modules stored in the form of computer readable instructions, for example, 212, 224, 226, 228, 230, 232, 234, and 236. The processor 204 is configured to execute the defined computer program instructions in the modules. Further, the processor 202 is configured to execute the instructions in the memory 210 simultaneously. The display 206 includes a High-Definition Multimedia Interface (HDMI) display 206 and a cooling fan (not shown in the figure).

According to an embodiment, the control unit 200 may be a personal computing device, a workstation, a client device, a network enabled computing device, any other suitable computing equipment, and combinations of multiple pieces of computing equipment. In an embodiment, the control unit 200 is configured on a cloud computing-based platform implemented as a service for analyzing data. Additionally, control personnel may access the control unit 200 via the GUI 208. The GUI 208 is, for example, an online web interface, a web based downloadable application interface, etc.

The processor 204 executes a system response module 224, a simulation response module 212, a hybrid model generator 226, a diagnosis module 228, a life module 230, a failure detection module 232, a prediction module 234, and a sensor module 236.

The system response module 224 on execution determines a system response associated with one or more failure modes of the electro-mechanical system 280 from the sensor data.

The simulated response module 212 is configured to receive a simulated response associated with the one or more failure modes of the electro-mechanical system 280. The simulated response module 212 includes a model generator module 214 to generate a system model of the electro-mechanical system based on multi-physics model. The system model includes virtual sensor data for the sensors 282-288. The simulated response module 212 further includes a model validation module 216 to validate the system model of the electro-mechanical system 280 based on the sensor data from the sensors 282-288. Furthermore, the simulated response module 212 includes a model updater module 218 to update the system model with the sensor data from the sensors 282-288 to reflect a current state of the electro-mechanical system 280. The system model generates the simulated response during simulation of the one or more failure modes in the system model.

To simulate the one or more failure modes, the simulation response module 212 includes a failure mode module 220 to generate the one or more failure mode including deformation and fracture modes, creep or fatigue of the electro-mechanical system 280. The failure modes are generated for each mission profile of the electro-mechanical system 280.

A mission profile module 222 on execution generates the mission profiles for the electro-mechanical system based on thermo-mechanical loads and load variability of the electro-mechanical system. The system response module determines the simulated response for the mission profiles and the at least one failure mode.

The hybrid model generator 226 generates a hybrid model of the electro-mechanical system 280 in real-time based on the system response and the simulated response. In an embodiment, the hybrid module generator 226 includes a model validation module, a model updater module, a failure mode module and a mission profile module.

The diagnosis module 228 generates a diagnosis of operation of the electro-mechanical system 280 based on the hybrid model. The life module 230 predicts a life trend of the electro-mechanical system based on the diagnosis.

The failure detection module 232 detects one or more failures in the electro-mechanical system 280 based on the hybrid model. The life module 230 estimates a remaining life trend of the electro-mechanical system 280 prior the at least one failure and post the one or more failures. The prediction module 234 predicts performance of the electro-mechanical system 280 based on the remaining life trend. The prediction module 234 also predicts a further failure in the electro-mechanical system 280 based on the predicted performance. The processor 204 generates a control command based on the predicted further failure of the electro-mechanical system 280.

The prediction module 234 includes a maintenance module to predict a potential-to-functional failure interval (P-F interval). The maintenance module optimizes inspection interval and management of back-up of the electro-mechanical system 280. As used herein, management of back-up refers to management of spare parts associated with the electro-mechanical system and its components.

The sensor module 236 determines an optimal sensor position for the sensors 282-288 based on the hybrid model. The optimal sensor position is validated based on the system model of the electro-mechanical system 280 using a soft sensor technique.

The control unit 200 is advantageous as it is capable of performing the diagnosis and life prediction of the electro-mechanical system without any historical sensor data associated with the operation of the electro-mechanical system 280. Further, the simulation response and the system response are calibrated at the same place to provide prompt diagnosis of the electro-mechanical system.

Figure 3:
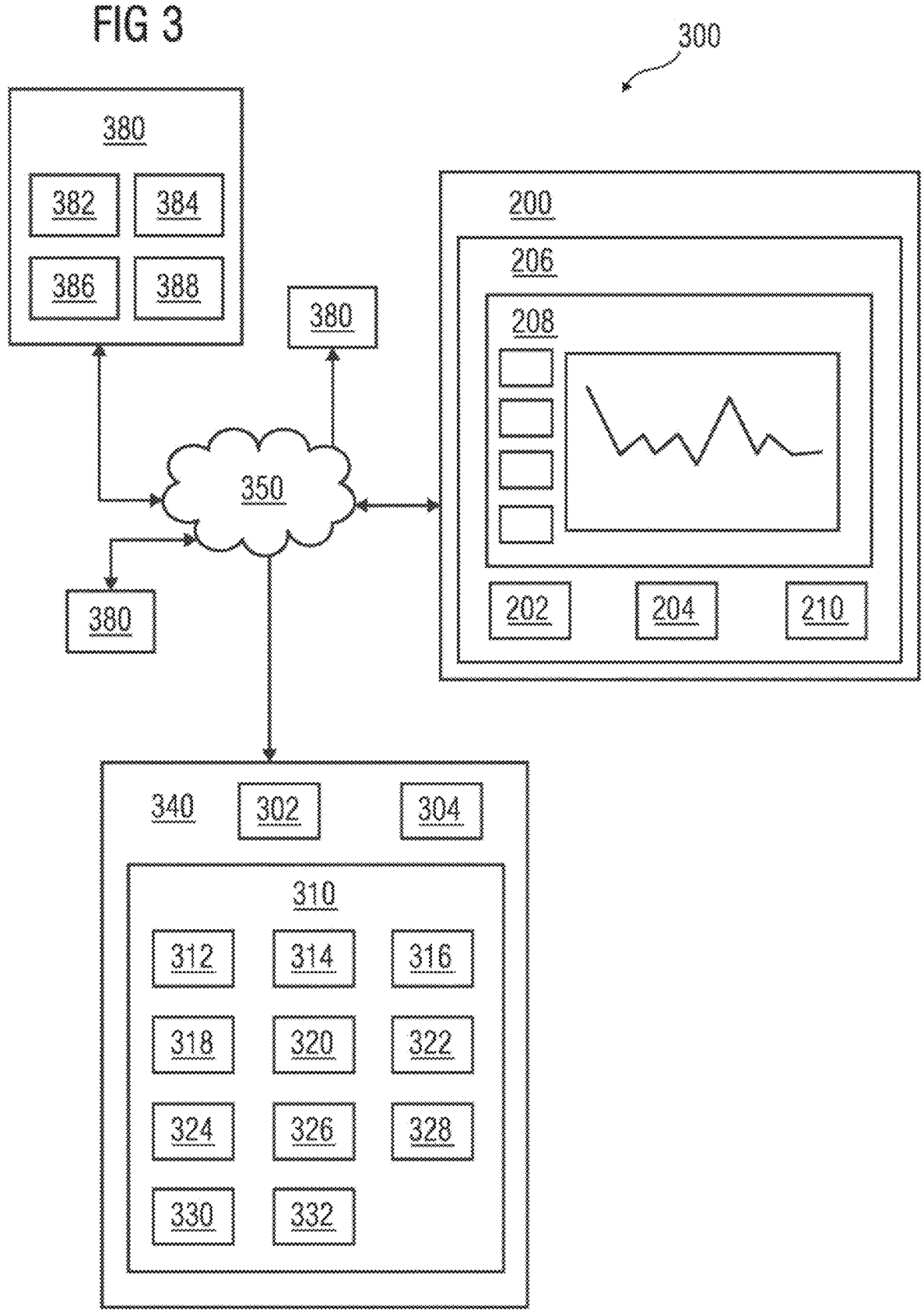
FIG. 3 illustrates a block diagram of a system for of diagnosis and life prediction of multiple electro-mechanical system, according an embodiment.

FIG. 3 illustrates a block diagram of a system 300 for of diagnosis and life prediction of multiple electro-mechanical systems 380, according an embodiment. The system 300 includes a server 340, a network interface 350 communicatively coupled to the server. In an embodiment, the system 380 includes sensors 382, 384, 386, and 388 associated with the electro-mechanical systems 380 communicatively coupled to the server 340 via the network interface 350. The system 300 also includes one or more control units 200 communicatively coupled to the server 340. The operation of the control unit 200 has been elaborated in FIG. 2.

The server 340 includes a communication unit 302, a processing unit 304 and a memory 310. The memory 310 is configured to store computer program instructions defined by modules, for example, failure identification module 312. In an embodiment, server 340 may also be implemented on a cloud computing environment, where computing resources are delivered as a service over the network 350.

As used herein, "cloud computing environment" refers to a processing environment including configurable computing physical and logical resources, for example, networks, servers, storage, applications, services, etc., and data distributed over the network 350, for example, the internet. The cloud computing environment provides on-demand network access to a shared pool of the configurable computing physical and logical resources. The network 350 is, for example, a wired network, a wireless network, a communication network, or a network formed from any combination of these networks.

The processing unit 304 of the server executes the following modules: failure identification module 312, failure isolation module 314, failure classification module 316, fleet diagnosis module 318, fleet life module 320, fleet monitoring module 322, fleet degradation module 324, reliability module 326, failure simulation module 328, availability module 330, and maintenance module 332.

On execution, failure identification module 312 identifies presence of one or more failures in the electro-mechanical systems 380 based on the hybrid model determined by a hybrid model generator similar to the hybrid model generator 226 of the control unit 200. The failure isolation module 314 identified a faulty electro-mechanical system (not shown in FIG. 3) of the electro-mechanical system 380 with the one or more failure. Further, the failure classification module 316 classifies the one or more failure based on a system response and a simulated response associated with the faulty electro-mechanical system.

The processing unit 304 executed the fleet diagnosis module 318 to generate a fleet diagnosis associated with operation of the electro-mechanical systems 380 based on the hybrid model. Further, the fleet life module 320 is used to predict a fleet life trend of the electro-mechanical systems 380 based on the fleet diagnosis. Furthermore, the fleet monitoring module 322 monitors a fleet response and a simulated fleet response of the electro-mechanical systems 380 based on application of the hybrid model on the electro-mechanical systems 380.

The fleet degradation module 324 on execution determines a fleet degradation for the electro-mechanical systems 380 based on the fleet response and the simulated fleet response. Further, a remaining life trend of the electro-mechanical systems 380 is generated based on the fleet degradation. The reliability module 326 predicts a fleet reliability based on the fleet degradation. The fleet life module 320 is configured to determine the fleet life trend of the plurality of electro-mechanical systems based on the fleet reliability and the remaining life trend of the electro-mechanical systems 380.

The memory 310 further includes the failure simulation module 328 to predict a failure simulation associated with the one or more failure. The failure simulation includes fatigue simulation, fracture simulation and wear simulation. The fleet life module 320 determined the remaining life trend based on the fatigue simulation. Furthermore, the memory 310 includes availability module 330 that determines a fleet availability of the electro-mechanical systems 380 on execution, based on the fleet life trend. The memory 310 also includes the maintenance module 332 to predict the P-F interval and optimize inspection interval and management of back-up for the electro-mechanical systems 380 based on the fleet availability.

Figure 4:
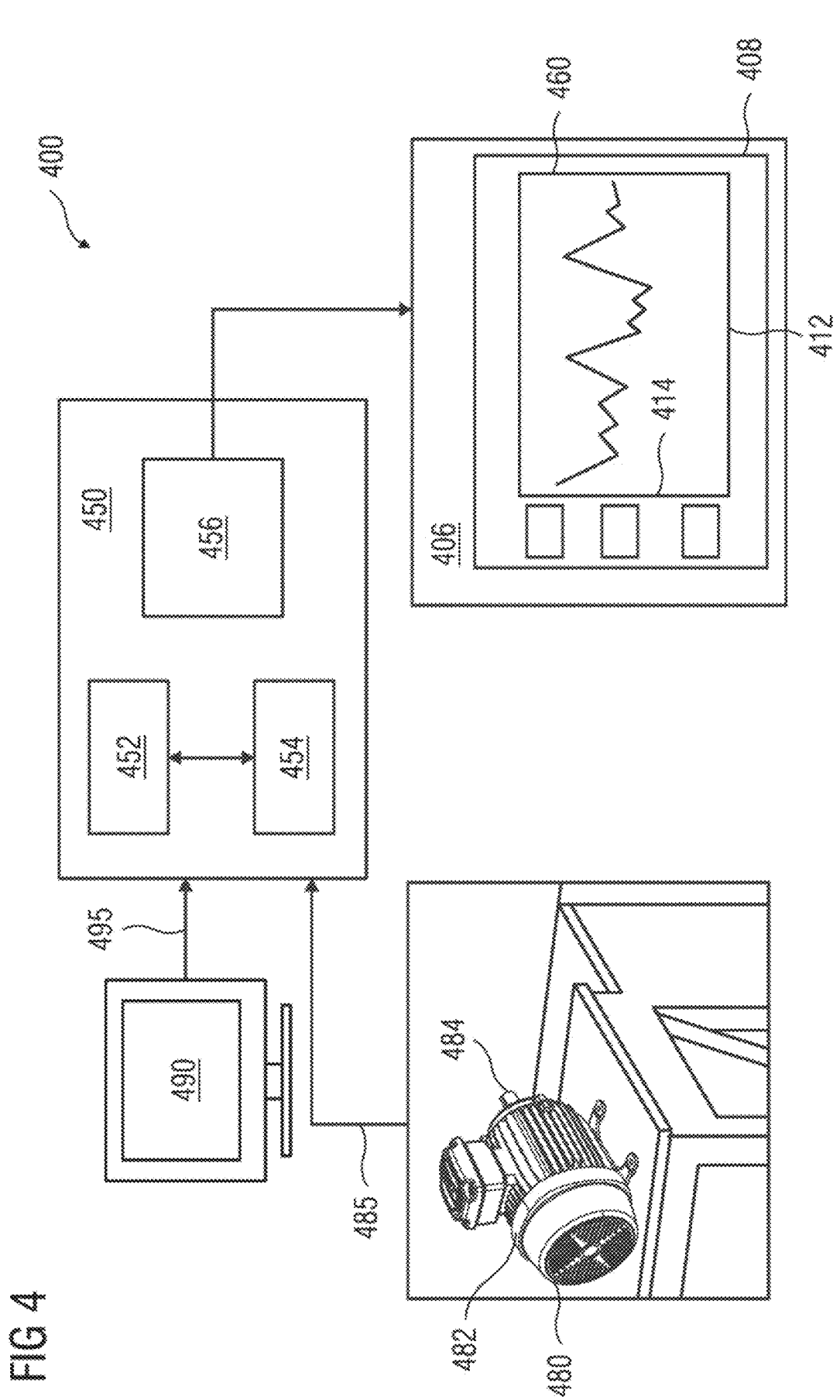
FIG. 4 illustrates a block diagram of an example of a system for of diagnosis and life prediction of an electro-mechanical system.

FIG. 4 illustrates a block diagram of a system 400 for of diagnosis and life prediction of an electro-mechanical system 480. The electro-mechanical system 480 as shown in FIG. 4 is an electric motor 480 that includes a vibration sensor 482 and a thermostat 484.

The system 400 includes a simulation platform 490, a control unit 450 and a display device 406. The control unit 450 is placed on the electric motor 480 or in close proximity. As shown in the figure, a system response 485 is generated by the electric motor 480 and a simulated response 495 is generated by the simulation platform 490. The simulation platform 490 includes a system model of the electric motor 480. Accordingly, the system model of the simulation platform generates the simulated response 495. The control unit 450 receives the simulated response 495 at a simulation response module 452 and the system response 485 at a system response module 454. The simulated response 495 is validated at a model validation module 456. The simulated response 495 is validated for various failure modes and mission profiles.

Based on the validation, the control unit diagnosis the electric motor 480 and predicts a life trend 460 of the electric motor 480. The life trend 460 is displayed by a GUI 408 on the display device 406. In an embodiment, the GUI displays the life trend 460 as a graph of time 412 versus performance 414 of the electric motor 480. The performance 414 includes predicted performance when a failure occurs and remaining life trend prior and post the failure.

Figure 5:
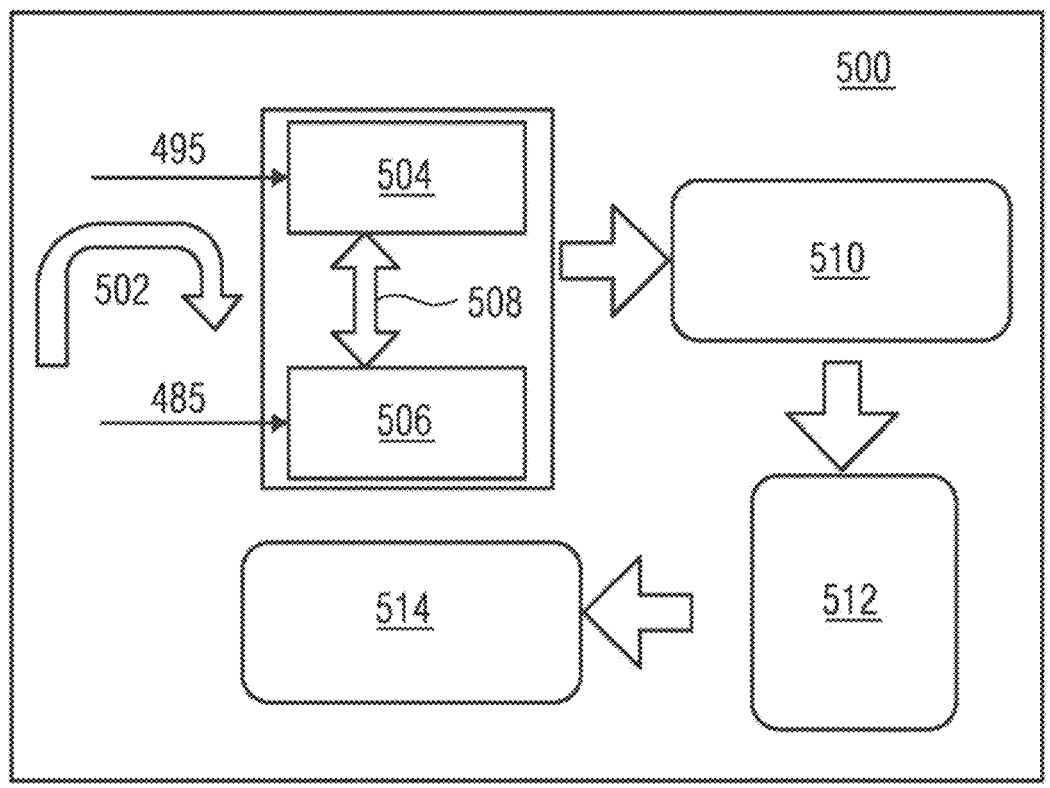
FIG. 5 illustrates stages to determine remaining useful life of the electro-mechanical system in FIG. 4.

FIG. 5 illustrates stages to determine remaining useful life of the electro-mechanical system 480. The simulated response 495 is continuously tuned at act 502 with sensor data from the sensors 482 and 484 of the electric motor 480. At act 504 the simulated response 495 is received and at act 506 the system response 485 is received.

The simulated response 495 is validated at act 508 with the system response 485. The validated simulated response is used to diagnose the electro-mechanical system 480 for failures such as Misalignment or Unbalance etc. Further, the reliability based mean remaining life is determined at act 512. At act 514, failure is predicted based on the diagnosis of the electro-mechanical system 480.

Figure 6:
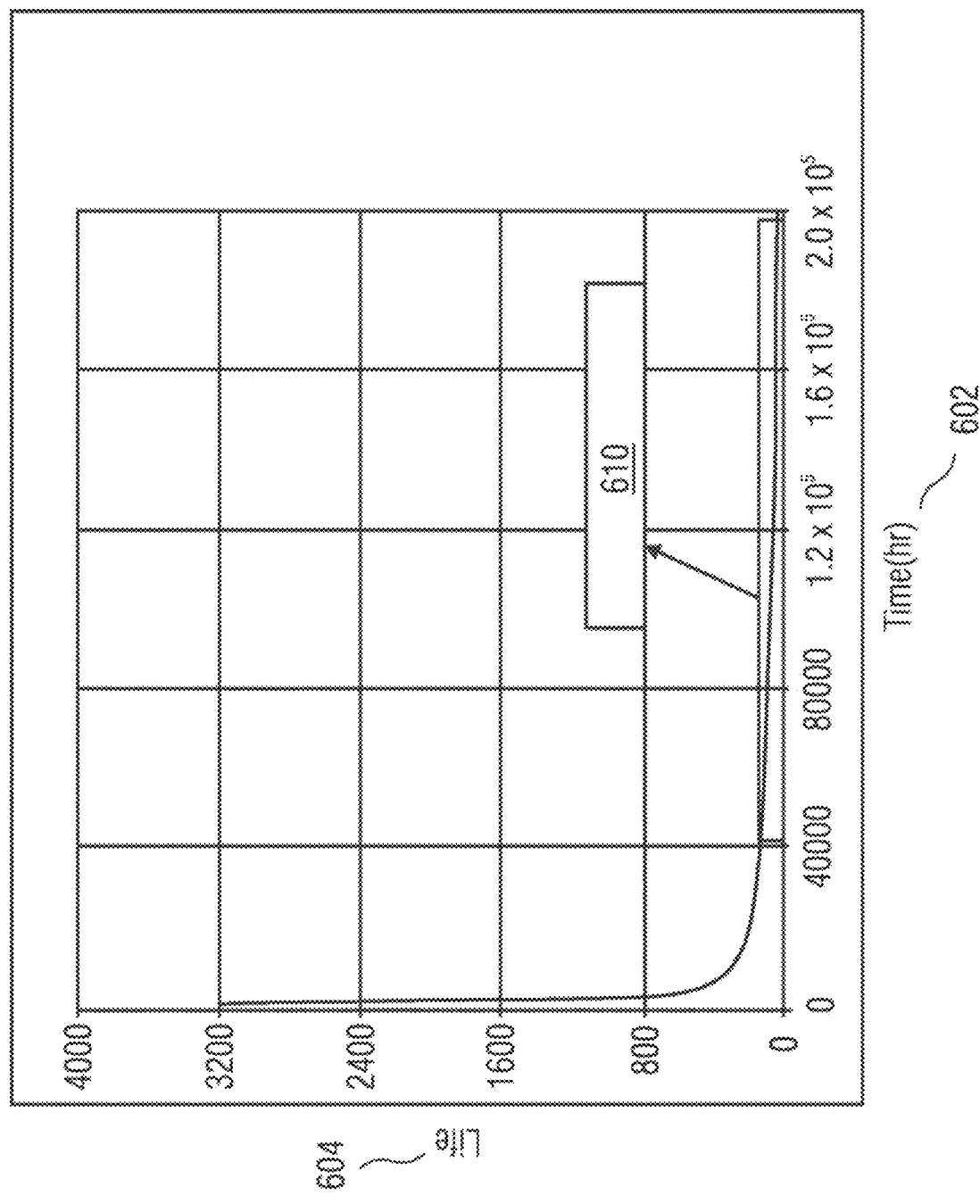
FIG. 6 illustrates the remaining life determined in FIG. 5.

FIG. 6 illustrates the remaining life determined in FIG. 5. The remaining life, e.g., remaining useful life, for an electric motor is shown. The y-axis 604 indicates mean life in hours and the x-axis 602 shows remaining hours of operation. A control unit as described in FIG. 2 is configured to predict remaining life of the electric motor. Accordingly, the control unit displays suggestions to an operator to reduce speed of the electric motor if there is a requirement of extending the remaining life. For example, if there is a lack of available back-up, the electric motor will be required to have extended remaining life and accordingly needs to be run at a reduced power.

Figure 7:
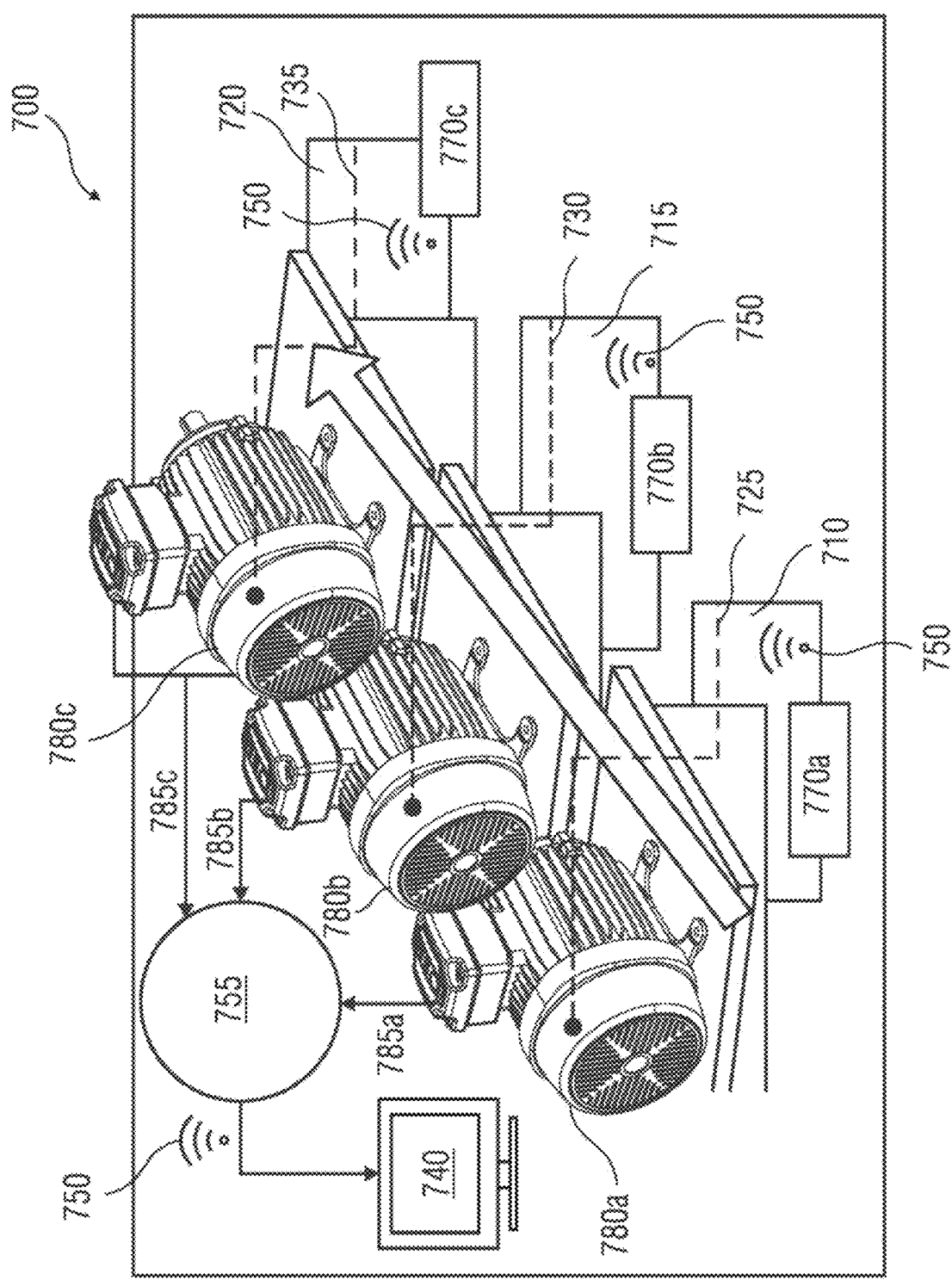
FIG. 7 illustrates stages to analyze fleet reliability and fleet availability for multiple electro-mechanical systems, according to an embodiment.

FIG. 7 illustrates stages to analyze fleet reliability and fleet availability for multiple electro-mechanical systems 780a, 780b, and 780c in an industrial automation environment 700.

As shown in the figure the electro-mechanical systems 780a-780c include induction motors. Operation of the induction motors 780a, 780b, and 780c is monitored by sensors 725, 730, and 735, respectively. Each of the induction motors 780a, 780b, and 780c are provided with a control unit 770a, 770b and 770c, respectively. The sensors 725-735 are capable of communicating sensor data to control units associated with the induction motors via a wireless network interface 750. The operation of the induction motors 780a-780c is monitored by a control server 740.

As shown in FIG. 7, the first stage of fleet reliability is at stage 710 where mission profiles and failure modes are learnt on a test electro-mechanical system. In an embodiment, the induction motor 780a is used as a test electro-mechanical system to build a hybrid model. The hybrid model is built by a control unit 770a. To build the hybrid model, the control unit 770a generates a system model and performs simulation for with various mission profiles with different defects like rotor bar loose, rotor unbalance, bearing defects, uneven air gap, misalignment of the rotor shaft with external load and loose foundation, etc. A system response 785a is captured by sensors 725 in the induction motor 780a. A simulated response is generated from the system model and validated by the control unit 770a.

The control unit 770a is capable of understanding the mission profiles of the induction motor 780a. The control unit 780a determines the simulation response from the system model when there is no failure. The simulated response is validated by the system response of the induction motor 780a. The system model of the induction motor 780a is suitably modified for the induction motors 780b and 780c.

The hybrid model generated by the control unit 770a is then communicated to control units 770b and 770c via a wireless network interface 750. The hybrid model applied in the control unit 770b is used to teach the control unit 770b and the induction motor 780b scenarios with no failure. Accordingly, the next stage is a teaching stage 715 where the hybrid model learnt at stage 710 is used to teach the induction motor 770b. Further, at stage 720 the hybrid model applied to control unit 770c is capable of performing diagnosis and life prediction of the induction motor 780c.

The stages 710, 715 and 720 may be performed on all the induction motors 780a-780c and not limited to the example discussed above. In an embodiment, the response to failure modes in induction motors 780a-780c, e.g., system response 785a-785c is cumulatively analyzed for fleet reliability, fleet life trend, and fleet availability at stage 755. The fleet reliability, the fleet life trend and the fleet availability is determined according to the method 100B. Further, the fleet reliability, the fleet life trend, and the fleet availability are displayed on the control server 740 by the wireless network interface 750.

FIG. 8 illustrates failure identification in an electro-mechanical system 810, according to an embodiment. The electro-mechanical system in the figure is an induction motor 810. In an embodiment, the induction motor 810 is a 3 phase AC induction motor with power rating of 5.5 kW with a motor speed of 1450 RPM, having voltage of 415+/−10%.

As shown in FIG. 8, the induction motor 810 is coupled to a load 820 by a coupler 815. Alignment of the induction motor 810 and the load 820 is indicated by a dotted line 825. The alignment 825 is tabulated by a graph 830 and a table.

The graph 830 indicates misalignment through vibration measurement. On the x-axis, motor operation frequency 832 is provided and on the y-axis, root mean square (RMS) velocity 834 is provided in terms of mm/sec. The RMS velocity indicates vibration amplitude in terms of velocity. The graph 830 indicates a frequency 836 at which the RMS velocity is the highest.

In addition to the graph 830, FIG. 8 shows the table with various vibration amplitude scenarios provided in column 840 and corresponding status in column 850. The field 842 refers to a scenario where 2 times the vibration amplitude is below 50% of 1 times the operating frequency (i.e. 2× vibration amplitude<1× frequency). In such a scenario the status is normal 852. If 2 times vibration amplitude is between 50%-150% of 1 times the operating frequency (field 844), then the status is severe 854. If the 2 times vibration amplitude is greater than 150% of 1 times the operating frequency (field 846), then the induction motor 810 needs to be stopped 856.

A control unit associated with the induction motor 810 determines the misalignment by determining the 2× vibration amplitude. Thereafter, the control unit performs diagnosis and life prediction of the induction motor 810 according to the method 100A.

FIG. 9 is a table for failure identification in the electro-mechanical system in FIG. 8. The failure identified is misalignment and the type of misalignment is indicated in column 910. The column 910 includes angular misalignment 912, parallel misalignment 916 and combination misalignment 918.

The table in column 920 indicates phase of the misalignment. Accordingly, the column 920 includes axial phase shift of 180° in field 922, radial direction phase shift of 180° in field 924, and axial-radial position 180° phase shift in field 926.

Further, the table in column 930 indicates image associated with the types of misalignment. For example, image 932 indicates angular misalignment, image 934 indicates parallel misalignment and combination misalignment is indicated by image 936.

The control unit associated with the motor 810 is capable of determining the type of misalignment and the phase based on the table in FIG. 9.

FIG. 10 is an interaction matrix illustrating a failure model in an electro-mechanical system. As used herein, "failure model" refers to a simulation model that analyzes operation parameters and sensor data of the electro-mechanical system to predict the failure modes. The failure model is part of the system model.

In an embodiment, the electro-mechanical system is an integrated drive system. The matrix indicates three main operation phases; "as good as new" phase 1015, operation phase 1025, and "as bad as old" phase 1050. The "as good as new" phase is referred as first phase 1015 and the "as bad as old" phase is referred to as last phase 1050 hereinafter.

As shown in the figure, same parameters at the first phase 1015 are monitored at the last phase 1050. In the first phase 1015, the parameters include motor acceleration/velocity 1002, motor current/power 1004, motor temperature 1006, magnetic flux 1008, and load profile including shock load 1010. The load profile 1010 is based on demand and is also referred to mission profile.

Further, FIG. 10 shows the various failure modes and their interactions. The failure modes include parallel misalignment 1012, angular and combination misalignment 1014, bearing damage 1016, wear 1022, unbalance 1024, rotor bar loose 1026, bent shaft through sudden loading 1032, rotor rub 1034, rotor looseness 1036, crack 1042, shaft fatigue 1044 and sub surface fracture 1046.

The arrows indicate the interaction between the failures. For example, rotor bar loose 1026 and rotor looseness 1036 impact parallel alignment 1012 and vice versa. Further, the parallel alignment 1012 is impacted by failure through crack 1042 and angular and combination misalignment 1014. This is similarly seen for angular and combination misalignment 1014 is impacted by wear 1022, unbalance 1024 and bearing damage 1016, and vice versa. The failure though wear 1022 is impacted by unbalance 1024. While, failure through unbalance 1024 is impacted by wear 1022, bent shaft 1032, and rotor rub 1034. Similarly, failure through crack 1042 is impacted by shaft fatigue 1044 and vice versa.

The failure interaction during the operation phase 1025 is output in terms of change in the parameter values of motor acceleration/velocity 1052, motor current/power 1054, motor temperature 1056, magnetic flux 1058, and potential to failure value 1060. The output of the failure interaction is used to determine remaining life and generate a degradation model 1080.

FIG. 11 illustrates simulation response of a system model. The system model is generated for an electro-mechanical system such as an induction motor. As shown in the figure, the simulation response is prepared for failure modes of zero misalignment 1110, 0.5 mm misalignment 1120, and 1 mm misalignment 1130.

The simulation response is captured in as a graph with the x-axis indicating frequency 1102 and the y-axis indicating RMS velocity (mm/sec) 1104. The RMS velocity indicates vibration amplitude in terms of velocity. As shown in the figure, the simulation response at point 1150 indicates that the vibration amplitude changes twice due to misalignment.

Figure 12:
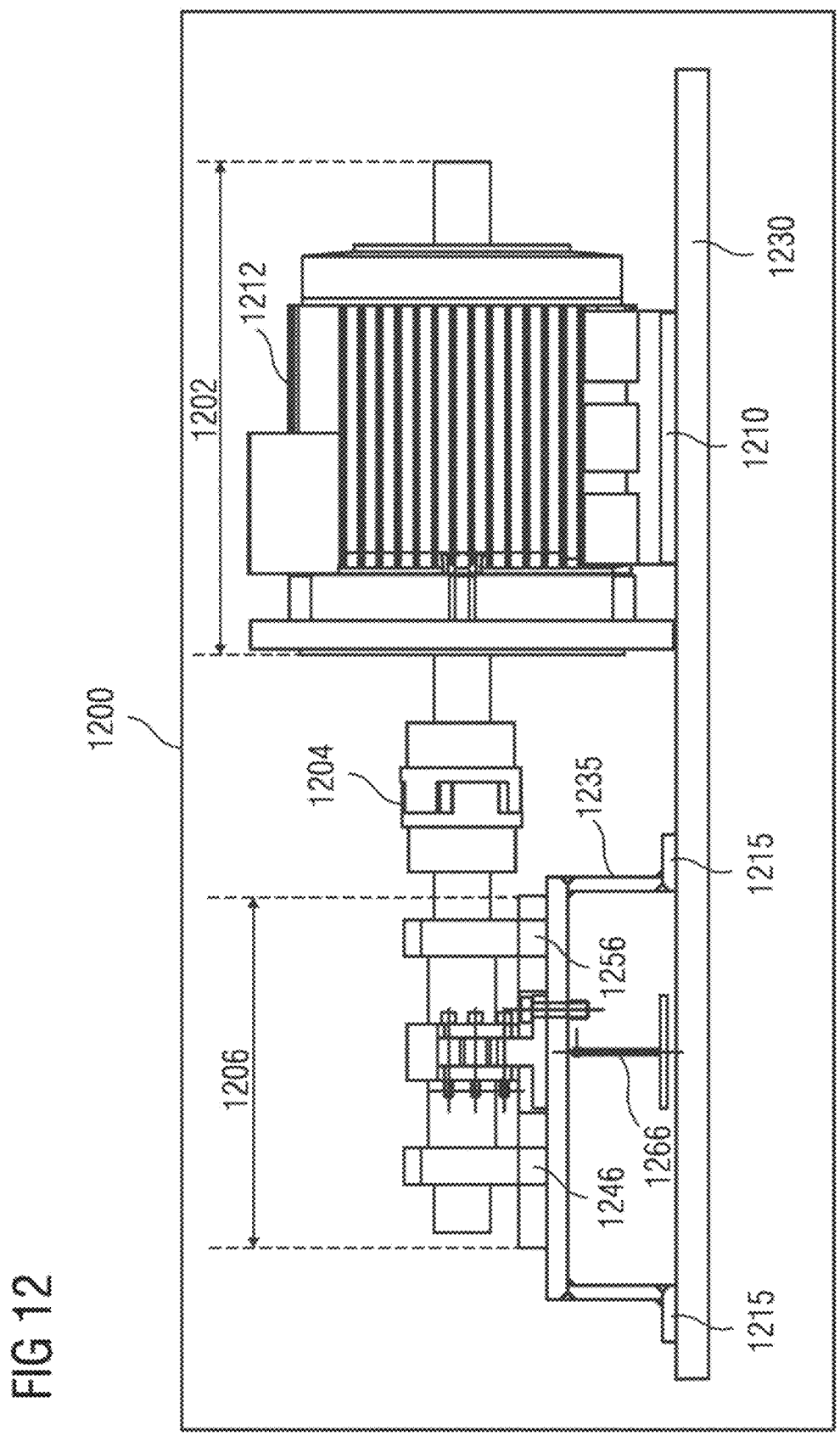
FIG. 12 illustrates identification of optimum sensor location for an electro-mechanical system, according to an embodiment.

FIG. 12 illustrates identification of optimum sensor location for an electro-mechanical system 1200. The electro-mechanical system 1200 includes a motor 1202, a gearbox 1204, load 1206, and a shaft 1208. The load 1206 includes a nylon rope 1266, which is a provision for applying load. The electro-mechanical system 1200 may be cumulatively referred to as motor-drive train.

A system model of the electro-mechanical system 1200 is generated based on physics of the electro-mechanical system 1200. The system model is continuously updated with the real-time sensor data from sensors monitoring operation of the electro-mechanical system 1200. The system model includes component models for components of the electro-mechanical system, such as motor model, gear model, etc. Accordingly, the system model is capable of simulating interaction between the component models.

The electro-mechanical system 1200 is fixed at motor constraint location 1210 to a housing 1230. The housing 1230 includes a platform 1235, fixed to the housing at platform constrain location 1215. Further, the load 1206 is also fixed to the platform 1235 of the housing 1230 at load constraint location 1246 and 1256. The system model of the electro-mechanical system 1200 is generated with similar constraint locations. In an embodiment, impact of the motor constraint location 1210, the platform constraint location 1215 and the load constraint location 1246 and 1256 on misalignment is determined based on a hybrid model built for the electro-mechanical system 1200.

In an embodiment, the determination of the optimum sensor location is done by simulating various failure modes in the system model and the electro-mechanical system 1200. Various versions of the system model are generated with differing virtual sensor locations. The various versions of the system model are used to generate simulation response. The simulation response is compared with the system response of the electro-mechanical system 1200 to determine the version of the system model with most accurate response measurement by the virtual sensor. Accordingly, the location of the virtual sensor will be determined as the optimum sensor location.

In FIG. 12, a pre-determined torque is applied to the motor 1202. The pre-determined torque is applied by adding associated weight at a mid-span of the shaft 1208. Similarly, the system model will be input with a simulation of the pre-determined torque on the motor model. The system response to the pre-determined torque and the simulation response from the system model are used to tune the hybrid model of the electro-mechanical system 1200. The hybrid model compares sensor data from the electro-mechanical system 1200 and virtual sensor data from the system model. Further, the optimum sensor location is determined based on whether the location of the sensor enables prompt diagnosis of the electro-mechanical system 1200. In the present embodiment, the optimum sensor location is at 1212 as simulation response at 1212 is measured most accurately.

It will be readily apparent that the various methods, algorithms, and modules disclosed herein may be implemented on computer readable media appropriately programmed for computing devices. The modules that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. The modules including computer executable instructions may be implemented in any programming language. The modules may be stored on or in one or more mediums as object code. Various aspects of the method and system disclosed herein may be implemented in a non-programmed environment including documents created, for example, in a hypertext markup language (HTML), an extensible markup language (XML), or other format that render aspects of a graphical user interface (GUI) or perform other functions, when viewed in a visual area or a window of a browser program. Various aspects of the method and system disclosed herein may be implemented as programmed elements, or non-programmed elements, or any suitable combination thereof.

Where databases including data points are described, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries may be different from those disclosed herein. Further, despite any depiction of the databases as tables, other formats including relational databases, object-based models, and/or distributed databases may be used to store and manipulate the data types disclosed herein. Likewise, object methods or behaviors of a database may be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present disclosure may be configured to work in a network environment including one or more computers that are in communication with one or more devices via a network. The computers may communicate with the devices directly or indirectly, via a wired medium or a wireless medium such as the Internet, cellular networks such as 4G or 5G and the like, a local area network (LAN), a wide area network (WAN) or the Ethernet, a token ring, or via any appropriate communications mediums or combination of communications mediums. Each of the devices includes processors, some examples of which are disclosed above, that are configured to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present disclosure is not limited to a particular computer system platform, processor, operating system, or network. One or more aspects may be distributed among one or more computer systems, for example, servers configured to provide one or more services to one or more client computers, or to perform a complete task in a distributed system. For example, one or more aspects may be performed on a client-server system that includes components distributed among one or more server systems that perform multiple functions according to various embodiments. These components include, for example, executable, intermediate, or interpreted code, which communicate over a network using a communication protocol. The present disclosure is not limited to be executable on any particular system or group of systems, and is not limited to any particular distributed architecture, network, or communication protocol.

The foregoing examples have been provided merely for the purpose of explanation and are in no way to be construed as limiting disclosed herein. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the disclosure in its aspects.

The invention claimed is:

1. A method of diagnosis and life prediction of an electro-mechanical system, the method comprising:
   receiving sensor data from a plurality of sensors associated with an operation of the electro-mechanical system;
   determining at least one system response associated with at least one failure mode of the electro-mechanical system from the sensor data, wherein the sensor data is indicative of the at least one failure mode of the electro-mechanical system;
   receiving at least one simulated response associated with the at least one failure mode of the electro-mechanical system, wherein the at least one failure mode is simulated on a system model of the electro-mechanical system;
   generating a hybrid model of the electro-mechanical system in real-time based on the at least one system response and the at least one simulated response, wherein the hybrid model combines the at least one system response and the at least one simulated response;
   generating a diagnosis of the electro-mechanical system based on the hybrid model, wherein the diagnosis includes identification and isolation of one or more failures in the electro-mechanical system and wherein the one or more failures is indicative of initiation of degradation of the electro-mechanical system; and
   predicting a life trend of the electro-mechanical system based on the diagnosis.

2. The method of claim 1, further comprising:
   generating the system model of the electro-mechanical system, wherein the system model is a simulation of the electro-mechanical system based on physics of the electro-mechanical system, wherein the system model comprises virtual sensor data for the plurality of sensors, and wherein generating the system model of the electro-mechanical system comprises:
      determining a sensor relationship model for the plurality of sensors, wherein the sensor relationship model is generated based on interdependency between the sensors associated with the electro-mechanical system; and
      generating virtual operation data associated with the electro-mechanical system, wherein the virtual operation data is a simulation of the virtual sensor data based on the sensor relationship model, wherein the system model of the electro-mechanical system is the virtual operation data;
   validating the system model of the electro-mechanical system based on comparison of the sensor data from the plurality of sensors;
   updating the system model with the sensor data from the plurality of sensors to reflect a current state of the electro-mechanical system; and
   generating the at least one simulated response during simulation of the at least one failure mode in the system model.

3. The method of claim 1, wherein the determining of the at least one system response comprises:
   generating the at least one failure mode comprising one of deformation and fracture modes, creep and fatigue of the electro-mechanical system;
   generating at least one mission profile for the electro-mechanical system based on thermo-mechanical loads and load variability of the electro-mechanical system; and
   determining the at least one system response for the at least one mission profile associated with the at least one failure mode.

4. The method of claim 1, further comprising:
   detecting at least one failure in the electro-mechanical system based on the hybrid model;
   estimating a remaining life trend of the electro-mechanical system prior the at least one failure and post the at least one failure;
   predicting performance of the electro-mechanical system based on the remaining life trend;
   predicting a further failure in the electro-mechanical system based on the predicted performance; and
   generating a control command based on the predicted further failure of the electro-mechanical system.

5. The method of claim 1, further comprising:
   determining optimal sensor position for the plurality of sensors based on the system model; and
   validating the optimal sensor position based on the hybrid model of the electro-mechanical system.

6. The method of claim 1, further comprising a diagnosis and life prediction of a plurality of electro-mechanical systems, the method further comprising:
   generating a system model for a first electro-mechanical system of the plurality of electro-mechanical systems based on based on physics of the electro-mechanical system;
   validating the system model of the first electro-mechanical system based on sensor data from a plurality of sensors associated with operation of the first electro-mechanical system;
   generating a hybrid model of the first electro-mechanical system in real-time based on at least one system response of the first electro-mechanical system and at least one simulated response of the system model of the first electro-mechanical system for the at least one failure mode;
   generating a fleet diagnosis associated with operation of the plurality of electro-mechanical systems based on the hybrid model of the first electro-mechanical system, wherein the diagnosis includes identification and location of at least one failure in the plurality of electro-mechanical systems; and
   predicting a fleet life trend of the plurality of the electro-mechanical systems based on the fleet diagnosis.

7. The method of claim 6, further comprising:
   identifying a presence of the at least one failure in the plurality of electro-mechanical systems by applying the hybrid model on the plurality of electro-mechanical systems;
   generating a control command for the plurality of electro-mechanical systems based on the presence of the at least one failure;
   identifying at least one electro-mechanical system of the plurality of electro-mechanical systems with the at least one failure based on the system response of the at least one electro-mechanical system, wherein the system response comprises parameters including vibration, temperature, voltage, current or magnetic flux; and classifying the at least one failure based on the system response and the simulated response associated with the at least one electro-mechanical system.

8. The method of claim 6, wherein the generating of the fleet diagnosis comprises:

monitoring a fleet response and a simulated fleet response of the plurality of electro-mechanical systems based on application of the hybrid model on the plurality of electro-mechanical systems;

determining a fleet degradation for the plurality of electro-mechanical systems based on the fleet response and the simulated fleet response;

predicting a fleet reliability based on the fleet degradation;

generating the fleet diagnosis associated with the operation of the plurality of electro-mechanical systems based on the fleet reliability;

generating a failure simulation associated with the at least one failure, wherein the failure simulation comprises fatigue, fracture and wear simulation;

determining the fleet life trend of the plurality of electro-mechanical systems based on the failure simulation and a remaining life trend of the plurality of electro-mechanical systems;

determining a fleet availability of the plurality of electro-mechanical systems based on the fleet life trend; and optimizing inspection interval and back-up for the plurality of electro-mechanical systems based on the fleet life trend and the fleet availability.

9. A control unit for diagnosis and life prediction of an electro-mechanical system, the control unit comprising:

a receiver configured to receive sensor data from a plurality of sensors associated with an operation of the electro-mechanical system;

at least one processor; and a memory communicatively coupled to the at least one processor, the memory and the at least one processor configured to:

determine at least one system response associated with at least one failure mode of the electro-mechanical system from the sensor data, wherein the sensor data is indicative of the at least one failure mode of the electro-mechanical system;

receive at least one simulated response associated with the at least one failure mode of the electro-mechanical system, wherein the at least one failure mode is simulated on a system model of the electro-mechanical system;

generate a hybrid model of the electro-mechanical system in real-time based on the at least one system response and the at least one simulated response, wherein the hybrid model combines the at least one system response and the at least one simulated response;

generate a diagnosis of the operation of the electro-mechanical system based on the hybrid model, wherein the diagnosis includes identification and isolation of one or more failures in the electro-mechanical system; and predict a life trend of the electro-mechanical system based on the diagnosis.

10. The control unit of claim 9, wherein the memory and the at least one processor are further configured to:

generate the system model of the electro-mechanical system based on physics of the electro-mechanical system, wherein the system model is a simulation of the electro-mechanical system based on the physics of the electro-mechanical system, and wherein the system model comprises virtual sensor data for the plurality of sensors;

validate the system model of the electro-mechanical system based on the sensor data from the plurality of sensors;

update the system model with the sensor data from the plurality of sensors to reflect a current state of the electro-mechanical system, wherein the system model generates the at least one simulated response during simulation of the at least one failure mode in the system model;

generate the at least one failure mode comprising one of deformation and fracture modes, creep and fatigue of the electro-mechanical system;

generate at least one mission profile for the electro-mechanical system based on thermo-mechanical loads and load variability of the electro-mechanical system; and determine the at least one simulated response for the at least one mission profile and the at least one failure mode.

11. The control unit of claim 9, wherein the memory and the at least one processor are further configured to:

detect at least one failure in the electro-mechanical system based on the hybrid model;

estimate a remaining life trend of the electro-mechanical system prior the at least one failure and post the at least one failure;

predict performance of the electro-mechanical system based on the remaining life trend;

predict a further failure in the electro-mechanical system based on the predicted performance;

generate a control command based on the predicted further failure of the electro-mechanical system;

predict a potential-to-functional failure interval and optimize inspection interval and management of back-up of the electro-mechanical system, wherein management of back-up comprises management of spare parts associated with the electro-mechanical system; and determine optimal sensor position for the plurality of sensors based on the hybrid model, wherein the optimal sensor position is validated based on the system model of the electro-mechanical system, and wherein the system model is a multi-physics model of the electro-mechanical system.

12. A system for diagnosis and life prediction of a plurality of electro-mechanical systems, the system comprising:

a server operable on a cloud computing platform;

a network interface communicatively coupled to the server;

a plurality of sensors associated with the plurality of electro-mechanical systems communicatively coupled to the server via the network interface; and at least one control unit communicatively coupled to the server, the at least one control unit configured to:

determine at least one system response associated with at least one failure mode of at least one electro-mechanical system of the plurality of electro-mechanical systems from sensor data, wherein the sensor data is indicative of the at least one failure mode of the at least one electro-mechanical system;

receive at least one simulated response associated with the at least one failure mode of the at least one electro-mechanical system, wherein the at least one failure mode is simulated on a system model of the at least one electro-mechanical system;

generate a hybrid model of the at least one electro-mechanical system in real-time based on the at least one system response and the at least one simulated response, wherein the hybrid model combines the at least one system response and the at least one simulated response;

generate a diagnosis of an operation of the at least one electro-mechanical system based on the hybrid model, wherein the diagnosis includes identification and isolation of one or more failures in the at least one electro-mechanical system; and predict a life trend of the at least one electro-mechanical system based on the diagnosis.

13. The system of claim 12, wherein the server comprises:

a communication unit configured to communicate with the at least one control unit in the plurality of electro-mechanical systems;

a processor communicatively coupled to the communication unit; and a memory communicatively coupled to the processor and the communication unit, the memory and the processor configured to:

identify presence of at least one failure in the plurality of electro-mechanical systems based on the hybrid model;

identify at least one electro-mechanical system of the plurality of electro-mechanical systems with the at least one failure; and classify the at least one failure based on system response and simulated response associated with the at least one electro-mechanical system.

14. The system of claim 13, wherein the memory and the processor are further configured to:

generate a fleet diagnosis associated with operation of the plurality of electro-mechanical systems based on the hybrid model;

predict a fleet life trend of the plurality of the electro-mechanical systems based on the fleet diagnosis, predict a failure simulation associated with the at least one failure, wherein the failure simulation comprises fatigue, fracture, and wear simulations, and wherein a remaining life trend is determined based on the fatigue simulation;

determine a fleet availability of the plurality of electro-mechanical systems based on the fleet life trend;

predict a potential-to-functional failure interval and optimize inspection interval and management of back-up for the plurality of electro-mechanical systems based on the fleet availability, wherein management of back-up comprises management of spare parts associated with the plurality of electro-mechanical systems;

monitor a fleet response and a simulated fleet response of the plurality of electro-mechanical systems based on application of the hybrid model on the plurality of electro-mechanical systems;

determine a fleet degradation for the plurality of electro-mechanical systems based on the fleet response and the simulated fleet response, wherein the remaining life trend of the plurality of electro-mechanical is generated based on the fleet degradation;

predict a fleet reliability based on the fleet degradation; and determine the fleet life trend of the plurality of electro-mechanical systems based on the fleet reliability and the remaining life trend of the plurality of electro-mechanical systems.

15. The system of claim 13, wherein the at least one system response and the at least one simulated response comprise parameters selected from the group consisting of: vibration, temperature, voltage, current, and magnetic flux.

* * * * *